United States Patent
Berrington et al.

(10) Patent No.: US 10,311,152 B2
(45) Date of Patent: Jun. 4, 2019

(54) SYSTEM FOR QUEUE BASED OBJECT CLONING

(71) Applicant: HITACHI DATA SYSTEMS ENGINEERING UK LIMITED, Bracknell Berkshire (GB)

(72) Inventors: Neil Berrington, San Jose, CA (US); Hoc D Ngo, San Jose, CA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 399 days.

(21) Appl. No.: 15/105,196

(22) PCT Filed: Dec. 20, 2013

(86) PCT No.: PCT/US2013/076876
§ 371 (c)(1),
(2) Date: Jun. 16, 2016

(87) PCT Pub. No.: WO2015/094329
PCT Pub. Date: Jun. 25, 2015

(65) Prior Publication Data
US 2017/0031932 A1 Feb. 2, 2017

(51) Int. Cl.
*G06F 17/30* (2006.01)
(52) U.S. Cl.
CPC .. *G06F 17/30088* (2013.01); *G06F 17/30091* (2013.01)
(58) Field of Classification Search
CPC .............. G06F 17/30088; G06F 17/3009
See application file for complete search history.

(56) References Cited

U.S. PATENT DOCUMENTS

| 5,819,292 | A  | * | 10/1998 | Hitz ................. G06F 11/1435 714/15 |
| 7,870,356 | B1 | * | 1/2011 | Veeraswamy ......... G06F 3/0607 711/100 |
| 8,352,431 | B1 | * | 1/2013 | Protopopov ...... G06F 17/30082 707/640 |
| 8,954,399 | B1 | * | 2/2015 | Balakrishnan .... G06F 17/30159 707/692 |

(Continued)

OTHER PUBLICATIONS

International Search Report of PCT/US2013/076876 dated Aug. 12, 2014.

*Primary Examiner* — Mark D Featherstone
*Assistant Examiner* — Navneet Gmahl
(74) *Attorney, Agent, or Firm* — Mattingly & Malur, PC

(57) ABSTRACT

A file cloning process allows for quickly cloning files within a filesystem, such as when a user makes a copy of a directory containing files and subdirectories of files. A priority based main queue is filled by a depth first traversal of the directory to be copied with work items corresponding to files and subdirectories. Worker threads refer to the main queue for file cloning, subdirectory copying and directory traversal. Files that have not been modified since a most recent checkpoint are cloned without issuing a checkpoint request. Files that have been modified since the most recent checkpoint are moved to a delay queue. Once a checkpoint of the file system completes, the files in the delay queue are then moved to the main queue to retry cloning thereof. A secondary queue is also provided to prevent worker threads from becoming deadlocked in the main queue.

15 Claims, 38 Drawing Sheets

(56) References Cited

U.S. PATENT DOCUMENTS

| | | | |
|---|---|---|---|
| 2005/0065986 A1* | 3/2005 | Bixby | G06F 17/30088 |
| 2011/0196899 A1* | 8/2011 | Hughes | G06F 17/30091 |
| | | | 707/809 |
| 2012/0143825 A1* | 6/2012 | Boehm | G06F 17/30073 |
| | | | 707/648 |
| 2012/0226699 A1* | 9/2012 | Lillibridge | G06F 17/30336 |
| | | | 707/747 |
| 2013/0091102 A1* | 4/2013 | Nayak | G06F 3/0613 |
| | | | 707/692 |
| 2016/0004599 A1* | 1/2016 | Mam | G06F 17/30091 |
| | | | 711/103 |

* cited by examiner

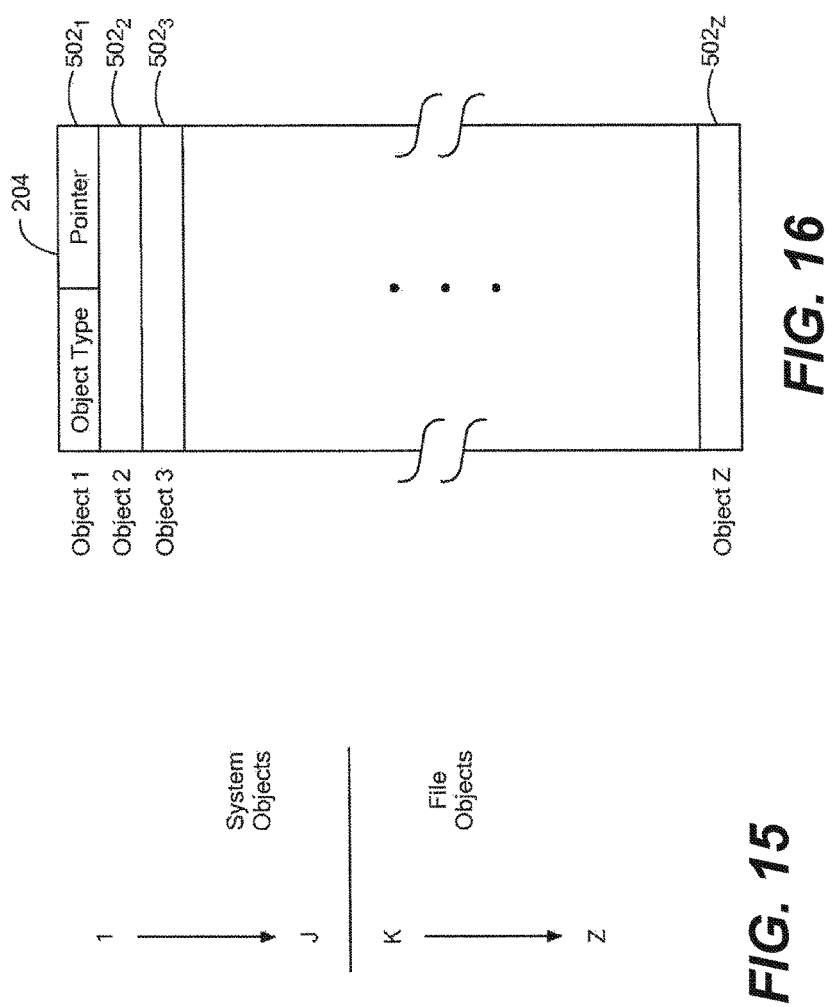

| TIME | MAIN QUEUE | THREAD TASK | | |
|---|---|---|---|---|
| | | EXECUTE | PUSH | REQUEUE |
| t0 | 11 | | | |
| t1 | | 11 | 21 | YES |
| t2 | 21, 11 | | | |
| t3 | 11 | 21 | F1, F2, 31, F3 | |
| t4 | F1, F2, F3, 31, 11 | | | |
| t5 | F2, F3, 31, 11 | F1 | | |
| t6 | F3, 31, 11 | F2 | | |
| t7 | 31, 11 | F3 | | |
| t8 | 11 | 31 | F6, 41 | |
| t9 | F6, 41, 11 | | | |
| t10 | 41, 11 | F6 | | |
| t11 | 11 | 41 | | |
| t12 | | 11 | 22 | YES |
| t13 | 21, 11 | | | |
| t14 | 11 | 22 | F4, 32, F5 | |
| t15 | F4, F5, 32, 11 | | | |
| t16 | F5, 32, 11 | F4 | | |
| t17 | 32, 11 | F5 | | |
| t18 | 11 | 32 | | |
| t19 | | 11 | 23 | |
| t20 | 23 | | | |
| t21 | | 23 | | |
| t22 | | (IDLE) | | |

*FIG. 37*

| | | |
|---|---|---|
| ① | IS DIRECTORY OR FILE | |
| ② | HANDLE TO OBJECT | |
| ③ | PRIORITY | |
| ④ | OBJECT CHECKPOINT NUMBER | |
| ⑤ | FILE LOCK | |
| ⑥ | LAST VISITED ENTRY NUMBER FOR DIRECTORY WORK ITEM | |
| ⑦ | RETRY COUNTER FOR FILE WORK ITEM | |

*FIG. 45*

SYSTEM FOR QUEUE BASED OBJECT CLONING

TECHNICAL FIELD AND BACKGROUND

The present invention relates to computer filesystems, and more specifically to computer file systems which include various filesystem structures which permit the maintenance of two copies of a file system including a current version and a prior "checkpoint" version of the filesystem where file data is de-duplicated in accordance with modifications to references of file system structures stored therein.

SUMMARY OF THE INVENTION

In embodiments of the present invention a file cloning mechanism is employed to allow for quickly creating copies (otherwise referred to in certain instances as clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. Some characteristics of such file cloning include: The data stream of a filesystem object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied. A very small and constant number of metadata blocks are mutated.

Cloning files provides certain advantageous effects to the file system and storage system. For example, the complexity of handling I/O to a cloned/clone object is equivalent to a regular object. The number of times a file or clone can be cloned is limited only by the amount of free space in the file system. The number of clones a file system can support is limited only by the amount free space in the file system. This file cloning has an inherent file de-duplication characteristic in that, rather than creating full copies of a source file and later performing de-duplication, the clones are essentially created as de-duplicated files that share data and metadata blocks with the source file. Corruption of a shared block would affect multiple files, although data corruption is mitigated through redundant storage (i.e., the RAID controller) and other mechanisms.

Furthermore, in embodiments of the present invention, a checkpoint mechanism is employed. Checkpoints can be initiated by request or otherwise triggered when certain events occur, for example, when a predetermined amount of time has elapsed since a last storage of the file structures into the storage system, when a portion of the non-volatile storage used for storage of the file system request data is becoming full, when a sector cache associated with the storage system is becoming full, or in certain instances where file system directories are copied. With respect to each checkpoint, there is stored, on disk, current file structure information that supersedes previously stored file structure information from an immediately preceding checkpoint. Checkpoints may be numbered sequentially and used to temporally group processing of file system operations.

In a particular embodiment, the storage system and corresponding file system are provided with directory copying functionality. For a given file system, a directory thereof and the contents associated with that directory can be copied. In particular, the file system object representing the directory is copied and the files stored therein are subjected to cloning. A priority-based main queue is provided to organize the cloning of files and copying of the directory.

The work of copying an empty directory object or cloning a file object is hereafter referred to as a work item. Each work item is assigned a priority, with file work items having the highest priority and directory work items having a priority greater than their parent directory. The priority-based main queue is used to store all priority-based work items. Initially a directory work item is created for the top-level directory tree and is pushed to the main queue. As a result, it is the first work item to be executed. A pool of threads is dedicated to processing directory tree cloning to increase performance, each thread is also referred to herein as a worker thread or worker for short. All workers are in an idle state while waiting on the main queue to be filled with objects as work items. When a work item is pushed to the main queue, an idle worker will pick up the respective work item by popping it off the main queue, executing the associated task such as copying or cloning, and then returning back to the pool of idle workers.

In certain embodiments, if the work item is for a directory, the worker will walk the list of corresponding directory entries, creating an appropriate new work item for each entry that has never been visited before. If the new work item is a subdirectory, the worker creates an empty directory at the corresponding location in the destination tree as part of the process of creating a new work directory item. All new work items are pushed to the main queue, where the items with the highest priority appear at the front of the queue. To allow for depth-first traversal, the worker will re-queue the currently processed directory work item when it encounters a second subdirectory entry or has pushed a certain number of file work items to the main queue, whichever occurs first. In addition, to use system resources efficiently, the worker re-queues the currently processed directory work item when the total number of outstanding file work items reaches a certain limit. If a directory work item is re-queued, it will be marked with the location of the last visited entry so that cloning work can resume correctly when the same work item is executed again later. The worker will go back to the idle worker pool after the current work item is re-queued or when all the entries listed in the current directory work item have been visited.

If the work item is for a file, the worker will use a checkpoint-efficient file object cloning technique to clone it. The worker will first lock the file object to prevent further modifications. If the file object has not been modified since the most recently committed checkpoint, the worker will clone it immediately and unlock it without waiting for a checkpoint of the file system to complete. Otherwise, the worker unlocks the file and pushes the current file work item to a delay queue, which is managed separately from the main queue, and generates an asynchronous checkpoint request as long as the file system has no outstanding pending checkpoint request. When a pending checkpoint request is later executed, this item will be pushed by the file system from the delay queue to the main queue for another retry. This work item will later be popped off and executed by another idle worker. If this file is still not clonable after the number of retries reaches a threshold, the file work item is moved to the delay queue with the file still in locked state to prevent further modifications. When the next checkpoint is committed, the locked file work item will be moved to a different, separately managed secondary work queue. It will be popped off and executed by an idle worker from a different tree-cloning worker pool which is a secondary pool, which services the secondary work queue only. At this time the locked file already has all changes committed to disk and hence is suitable for cloning immediately without causing any infinite looping from the main queue to the delay queue, which may result when a file object is unlocked and subject to high frequency modifications.

BRIEF DESCRIPTION OF THE DRAWINGS

FIG. 15 shows a representation of object number assignments for an exemplary embodiment of the present invention;

FIG. 16 is a schematic block diagram showing the general format of the indirection object in accordance with an exemplary embodiment of the present invention;

FIG. 37 schematically shows a main queue and associated tasks according to the depth-first traversal of the directory structure shown in FIG. 31 according to an exemplary embodiment of the present invention;

FIG. 45 schematically shows various pieces of metadata that are stored in relationship to the directory copy processing according to the foregoing embodiments of the present invention.

DETAILED DESCRIPTION

Figure 1:
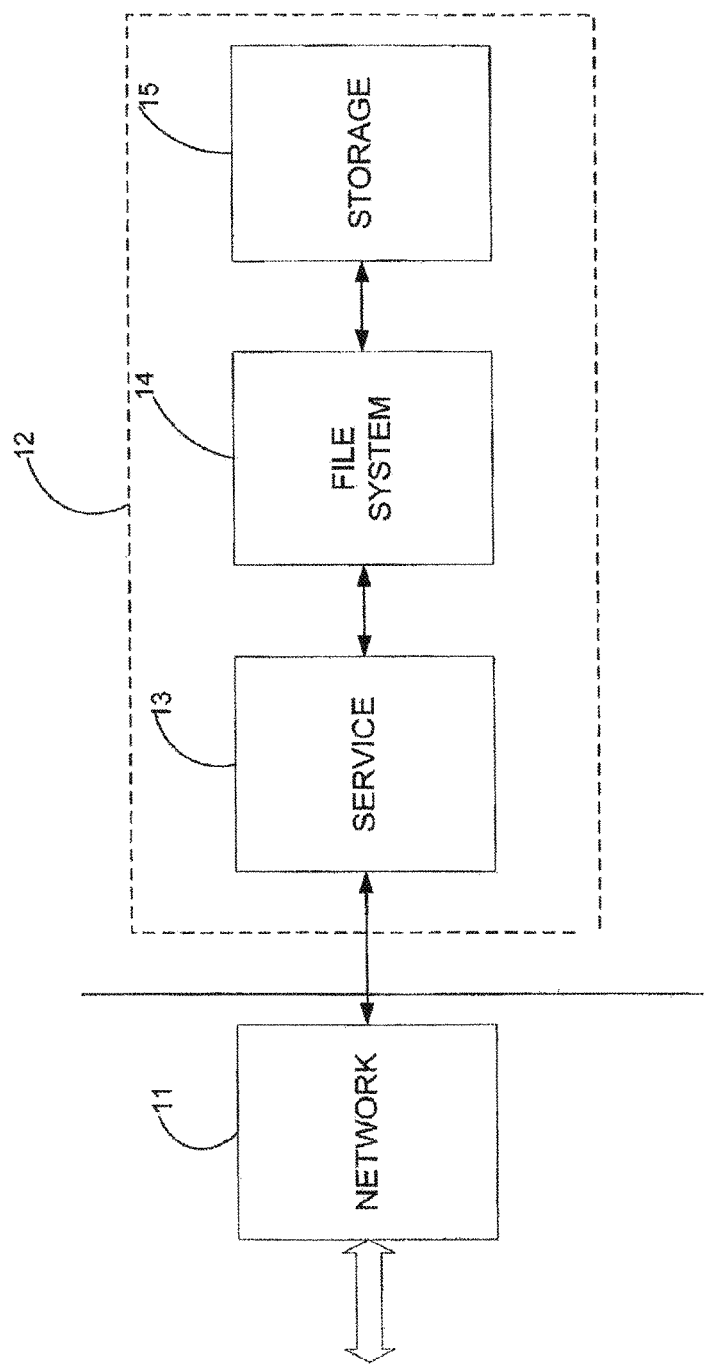
FIG. 1 is a logical block diagram of an embodiment of a file server to which various aspects of the present invention are applicable.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

A "set" of values may include one or more values. Headings are used below for convenience and are not to be construed as limiting the present invention in any way.

In certain embodiments of the present invention, a file cloning mechanism is employed to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. At appropriate times, cloned files may be "de-cloned."

Exemplary embodiments of the present invention are described with reference to an exemplary filesystem, although it should be noted that various cloning and de-cloning concepts may be applied to other types of filesystems.

FIG. 1 is a logical block diagram of an embodiment of a file server to which various aspects of the present invention are applicable. A file server of this type is described in U.S. Pat. No. 7,457,822, entitled "Apparatus and Method for Hardware-based File System" which is incorporated herein by reference and PCT application publication number WO 01/28179 A2, published Apr. 19, 2001, entitled "Apparatus and Method for Hardware Implementation or Acceleration of Operating System Functions" which is incorporated herein by reference. A file server 12 of FIG. 1 herein has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a sector cache for file content data that is being read from and written to storage. Further, each of the various modules may be hardware implemented or hardware accelerated.

Figure 2:
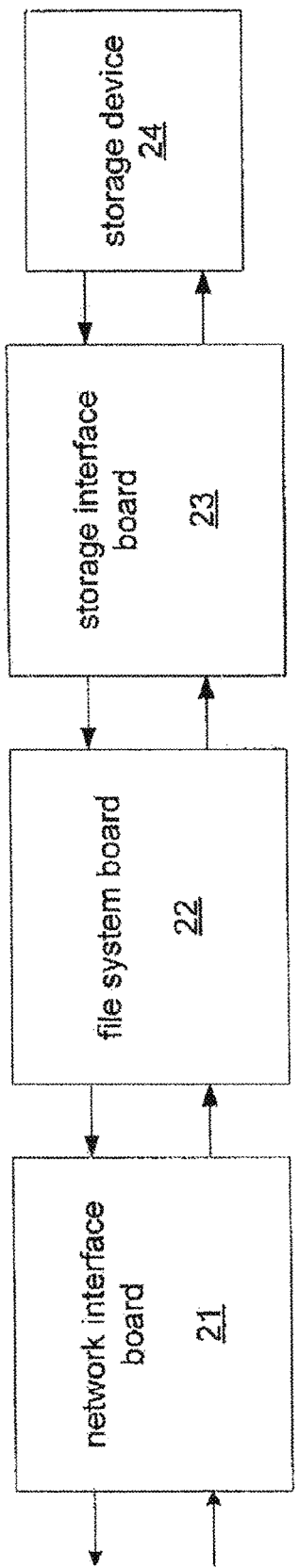
FIG. 2 is a logical block diagram of an implementation of the embodiment of FIG. 1.

FIG. 2 is a logical block diagram of an implementation of the embodiment of FIG. 1. In this implementation, the service module 13, file system module 14, and storage module 15 of FIG. 1 are implemented by network interface board 21, file system board 22, and storage interface board 23 respectively. The storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions", which is incorporated herein by reference. However, in an alternative implementation, the service module 13, file system module 14, and storage module 15 of FIG. 1 can be implemented integrally on a singular board such as a board having a single field programmable array chip (FPGA). In yet another alternative implementation, the network interface board 21 can be configured on a first board which is separate from the file system board 22 and storage interface board 23 which are configured together on a second board. It should be noted that the present invention is in no way limited to these specific board configurations or any particular number of boards.

Figure 3:
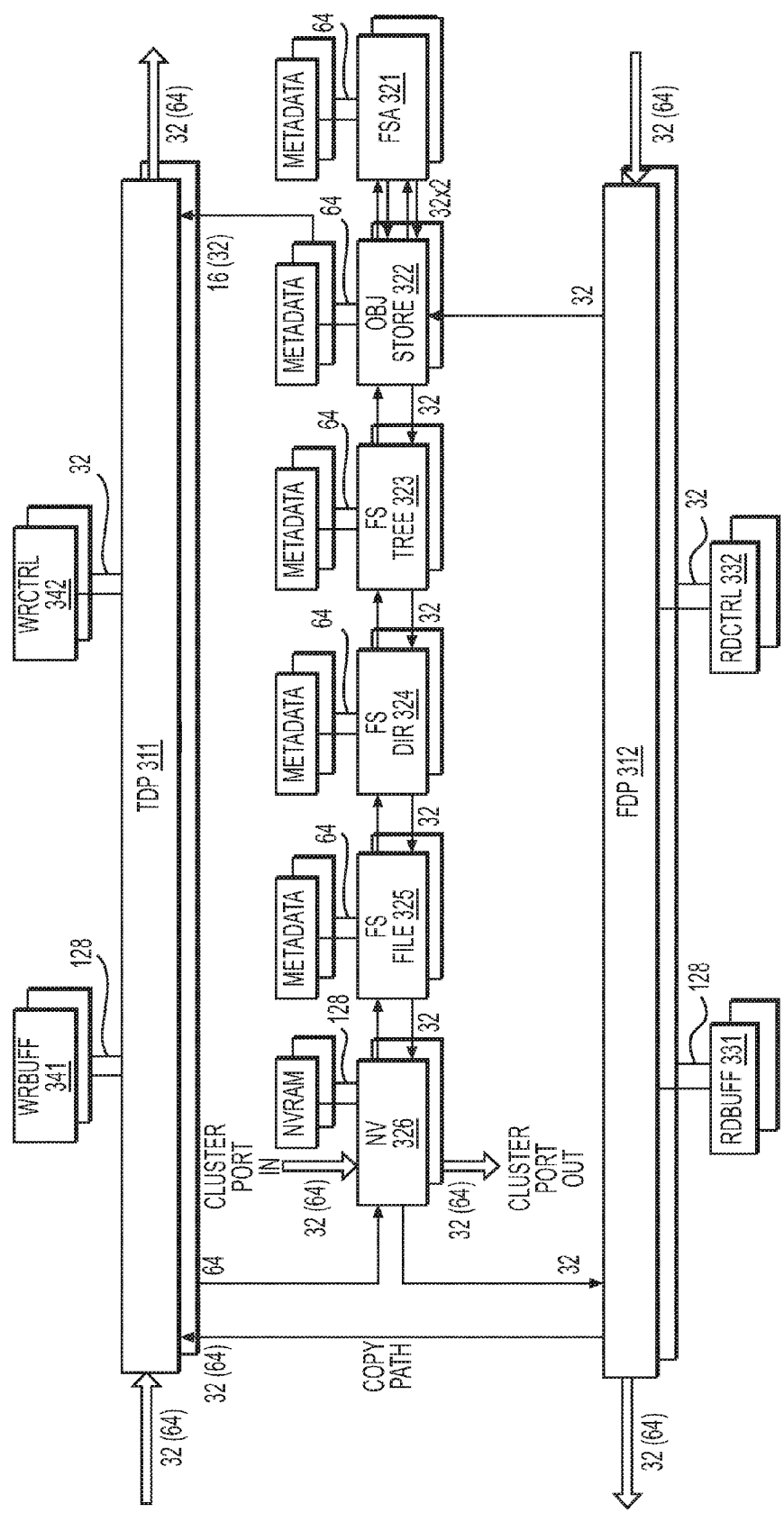
FIG. 3 is a block diagram of a file system module in accordance with an embodiment of the present invention.

FIG. 3 is a block diagram of an embodiment of a file system module in accordance with the present invention. The file system module embodiment may be used in systems of the type described in FIGS. 1 and 2. Exemplary bus widths for various interfaces are shown, although it should be noted that the present invention is in no way limited to these bus widths or to any particular bus widths.

The data flow in this embodiment is shown by upper bus 311, which is labeled TDP, for To Disk Protocol, and by lower bus 312, which is labeled FDP, for From Disk Protocol, such Protocols referring generally to communication with the storage module 15 of FIG. 1 as may be implemented, for example, by storage interface board 23 of FIG. 2. The file system module always uses a control path that is distinct from the data buses 311 and 312, and in this control path uses pointers to data that is transported over the buses 311 and 312. The buses 311 and 312 are provided with a write buffer WRBUFF and read buffer RDBUFF respectively. For back up purposes, such as onto magnetic tape, there is provided a direct data path, identified in the left portion of the drawing as COPY PATH, from bus 312 to bus 311, between the two buffers.

Figure 4:
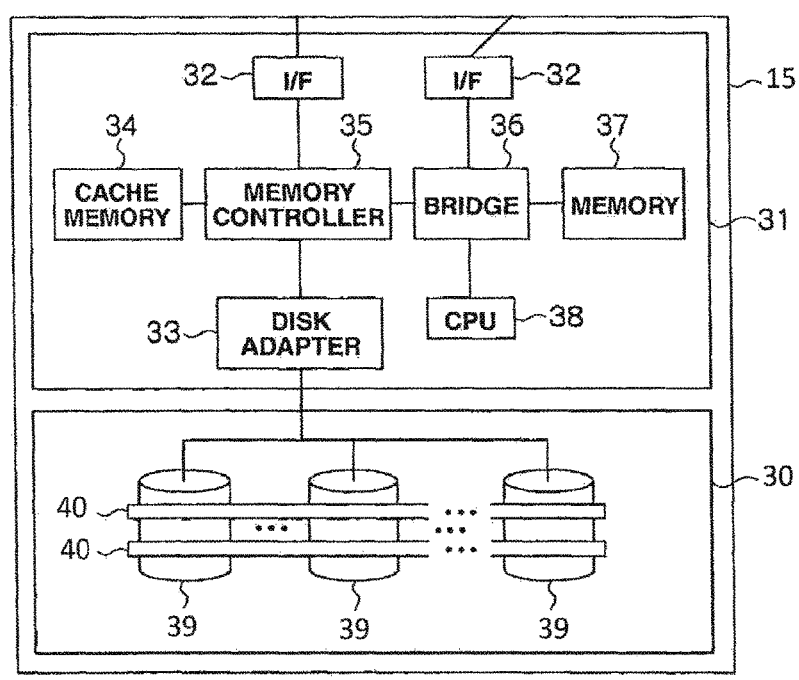
FIG. 4 is a physical block diagram showing the configuration of a storage system according to an embodiment of the present invention.

FIG. 4 shows a detailed physical block diagram of a storage module 15 according to an exemplary embodiment of the present invention. The storage module 15 is configured by a storage part 30 configured from a plurality of hard disk drives 39, and a control unit 31 for controlling the hard disk drives (otherwise referred to as a disk) 39 of the storage part 30.

The hard disk drive 39, for instance, is configured from an expensive disk drive such as an FC (Fibre Channel) disk, or an inexpensive disk such as a SATA (Serial AT Attachment) disk drive or an optical disk drive or the like. One or more logical volumes are defined in the storage areas (hereinafter referred to as "RAID groups") 40 provided by one or more of the hard disk drives 39. Data from the host system 2 is accessed (read from and written into) the logical volumes 26 in block units of a prescribed size.

A unique identifier (Logical Unit Number: LUN) is allocated to each logical volume 26. In the case of this embodiment, the input and output of data are performed by setting the combination of the foregoing identifier and a unique number (LBA: Logical Block Address) that is allocated to the respective logical blocks as the address, and designating this address.

The control unit 31 comprises a plurality of interfaces (I/F) 32, a disk adapter 33, a cache memory 34, a memory controller 35, a bridge 36, a memory 37, and a CPU 38.

The interface 32 is an external interface used for sending and receiving write data, read data and various commands to and from the storage system 15. The disk adapter 33 is an interface to the storage part 21, and, for example, is used for sending and receiving write data, read data or various commands to and from the storage part 30 according to a fibre channel protocol.

The cache memory 34, for instance, is configured from a nonvolatile semiconductor memory, and is used for temporarily storing commands and data to be read from and written into the storage part 30. The memory controller 35 controls the data transfer between the cache memory 34 and the memory 37, and the data transfer between the cache memory 34 and the disk adapter 33. The bridge 36 is used for sending and receiving read commands and write commands and performing filing processing and the like between the memory controller 36 and the CPU 38, or between the memory controller 36 and the memory 37.

In addition to being used for retaining various control programs and various types of control information, the memory 37 is also used as a work memory of the CPU 38. The CPU 38 is a processor for controlling the input and output of data to and from the storage part 30 in response to the read command or write command, and controls the interface 34, the disk adapter 33, the memory controller 35 and the like based on various control programs and various types of control information stored in the memory 37.

Returning to FIG. 3, a series of separate sub-modules of the file system module handle the tasks associated with file system management. Each of these sub-modules typically has its own cache memory for storing metadata pertinent to the tasks of the sub-module. (Metadata refers to file overhead information as opposed to actual file content data; the file content data is handled along the buses 311 and 312 discussed previously.) These sub-modules are Free Space Allocation 321, Object Store 322, File System Tree 323, File System Directory 324, File System File 325, and Non-Volatile Storage Processing 326.

The sub-modules operate under general supervision of a processor, but are organized to handle their specialized tasks in a manner dictated by the nature of file system requests being processed. In particular, the sub-modules are hierarchically arranged, so that successively more senior sub-modules are located successively farther to the left. Each sub-module receives requests from the left, and has the job of fulfilling each request and issuing a response to the left, and, if it does not fulfill the request directly, it can in turn issue a request and send it to the right and receive a response on the right from a subordinate sub-module. A given sub-module may store a response, provided by a subordinate sub-module, locally in its associated cache to avoid resending a request for the same data. In one embodiment, these sub-modules are implemented in hardware, using suitably configured field-programmable gate arrays. Each sub-module may be implemented using a separate field-programmable gate array, or multiple sub-modules may be combined into a single field-programmable gate array (for example, the File System Tree 323 and File System Directory 324 sub-modules may be combined into a single field-programmable gate array). Alternatively, each sub-module (or combination of sub-modules) may be implemented, for example, using integrated circuitry or a dedicated processor that has been programmed for the purpose.

Although the storage system, with respect to which the file system embodiment herein is being used, is referred to as the "disk," it will be understood that the storage system may be any suitable large data storage arrangement, including but not limited to an array of one or more magnetic or magneto-optical or optical disk drives, solid state storage devices, and magnetic tapes.

The Free Space Allocation sub-module 321 manages data necessary for operation of the Object Store sub-module 322, and tracks the overall allocation of space on the disk as affected by the Object Store sub-module 322. On receipt of a request from the Object Store sub-module 322, the Free Space Allocation sub-module 321 provides available block numbers to the Object Store sub-module. To track free space allocation, the Free Space Allocation sub-module establishes a bit map of the disk, with a single bit indicating the free/not-free status of each block of data on the disk. This bit map is itself stored on the disk as a special object handled by the Object Store sub-module. There are two two-way paths between the Object Store and Free Space Allocation sub-modules since, on the one hand, the Object Store sub-module has two-way communication with the Free Space Allocation sub-module for purposes of management and assignment of free space on the disk, and since, on the other hand, the Free Space Allocation sub-module has two-way communication with the Object Store sub-module for purposes of retrieving and updating data for the disk free-space bit map.

The File System File sub-module 325 manages the data structure associated with file attributes, such as the file's time stamp, who owns the file, how many links there are to the file (i.e., how many names the file has), read-only status, etc. Among other things, this sub-module handles requests to create a file, create a directory, insert a file name in a parent directory, and update a parent directory. This sub-module in turn interacts with other sub-modules described below.

The File System Directory sub-module 324 handles directory management. The directory is managed as a listing of files that are associated with the directory, together with associated object numbers of such files. File System Directory sub-module 324 manages the following operations of directories: create, delete, insert a file into the directory, remove an entry, look up an entry, and list contents of directory.

The File System Directory sub-module 324 works in concert with the File System Tree sub-module 323 to handle efficient directory lookups. Although a conventional tree structure is created for the directory, the branching on the tree is handled in a non-alphabetical fashion by using a pseudo-random value, such as a CRC (cyclic redundancy check sum), that is generated from a file name, rather than using the file name itself. Because the CRC tends to be random and usually unique for each file name, this approach typically forces the tree to be balanced, even if all file names happen to be similar. For this reason, when updating a directory listing with a new file name, the File System Directory sub-module 324 generates the CRC of a file name, and asks the File System Tree sub-module 323 to utilize that CRC in its index. The File System Tree sub-module associates the CRC of a file name with an index into the directory table. Thus, the sub-module performs the lookup of a CRC and returns an index.

The File System Tree sub-module 323 functions in a manner similar to the File System Directory sub-module 324, and supports the following functions: create, delete, insert a CRC into the directory, remove an entry, look up an entry. But in each case the function is with respect a CRC rather than a file.

The Non-Volatile Storage Processing sub-module 326 interfaces with associated non-volatile storage (called NVRAM in FIG. 4) to provide a method for recovery in the event of power interruption or other event that prevents cached data—which is slated for being saved to disk—from actually being saved to disk. In particular, since, at the last checkpoint, a complete set of file system structure has been stored, it is the task of the Non-Volatile Storage Processing sub-module 326 to handle storage of file system request data since the last checkpoint. In this fashion, recovery, following interruption of processing of file system request data, can be achieved by using the file system structure data from the last stored checkpoint and then reprocessing the subsequent file system requests stored in NVRAM.

In operation, the Non-Volatile Storage Processing sub-module 326, for every file system request that is received (other than a non-modifying request), is told by the processor whether to store the request in NVRAM, and, if so told, then stores in the request in NVRAM. (If this sub-module is a part of a multi-node file server system, then the request is also stored in the NVRAM of another node.) No acknowledgment of fulfillment of the request is sent back to the client until the sub-module determines that there has been storage locally in NVRAM by it (and any paired sub-module on another file server node). This approach to caching of file system requests is considerably different from prior art systems wherein a processor first writes the file system request to NVRAM and then to disk. This is approach is different because there is no processor time consumed in copying the file system request to NVRAM—the copying is performed automatically.

In order to prevent overflow of NVRAM, a checkpoint is forced to occur whenever the amount of data in NVRAM has reached a pre-determined threshold. A checkpoint is only valid until the next checkpoint has been created, at which point the earlier checkpoint no longer exists.

Figure 7:
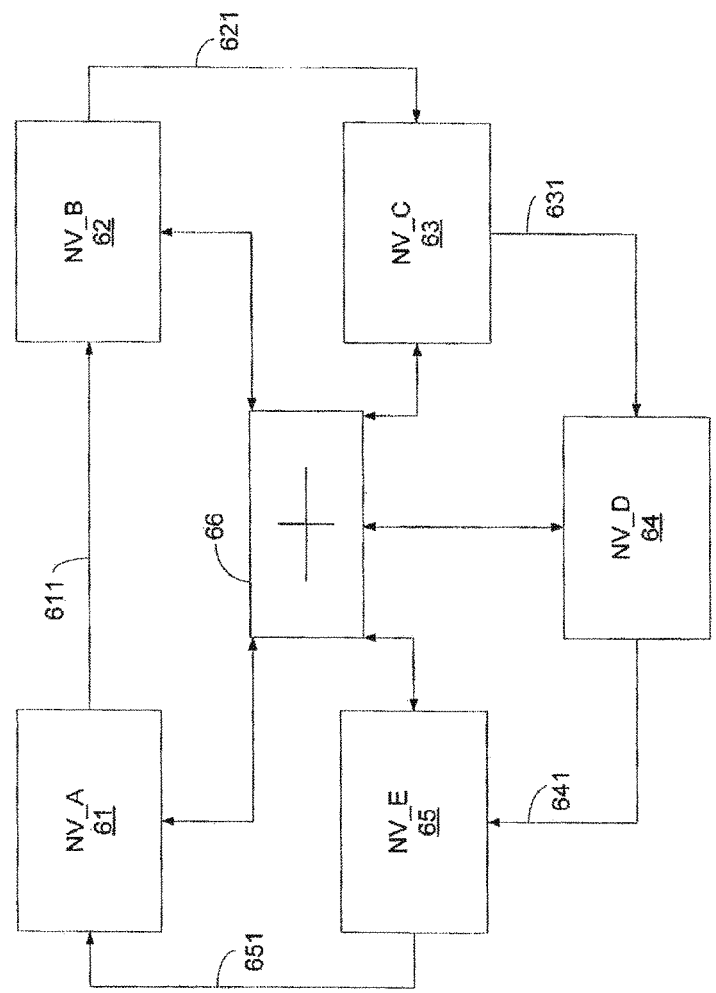
FIG. 7 is a block diagram of a clustered file server arrangement in accordance with an embodiment of the present invention wherein non-volatile memory is mirrored in a virtual loop configuration.

When file server systems are clustered, non-volatile storage may be mirrored using a switch to achieve a virtual loop. FIG. 7 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module.

In the event of a system failure, the processor detects that the on disk file system is not "clean" and it begins the recovery procedure. Initially, the on disk file system is reverted to the state represented by the last checkpoint stored on disk. Since this is a checkpoint, it will be internally consistent. However, any changes that were requested following the taking of this checkpoint will have been lost. To complete the recovery procedure, these changes must be restored. This is possible since these changes would all have been caused by requests issued by the processor, and (as explained above) all file system changes that have been requested by the processor but have not yet been stored on disk in a checkpoint are stored in NVRAM. The lost changes can therefore be restored by repeating the sequence of file system changing operations that were requested by the processor from the time of the last checkpoint until the system failure.

Figure 5:
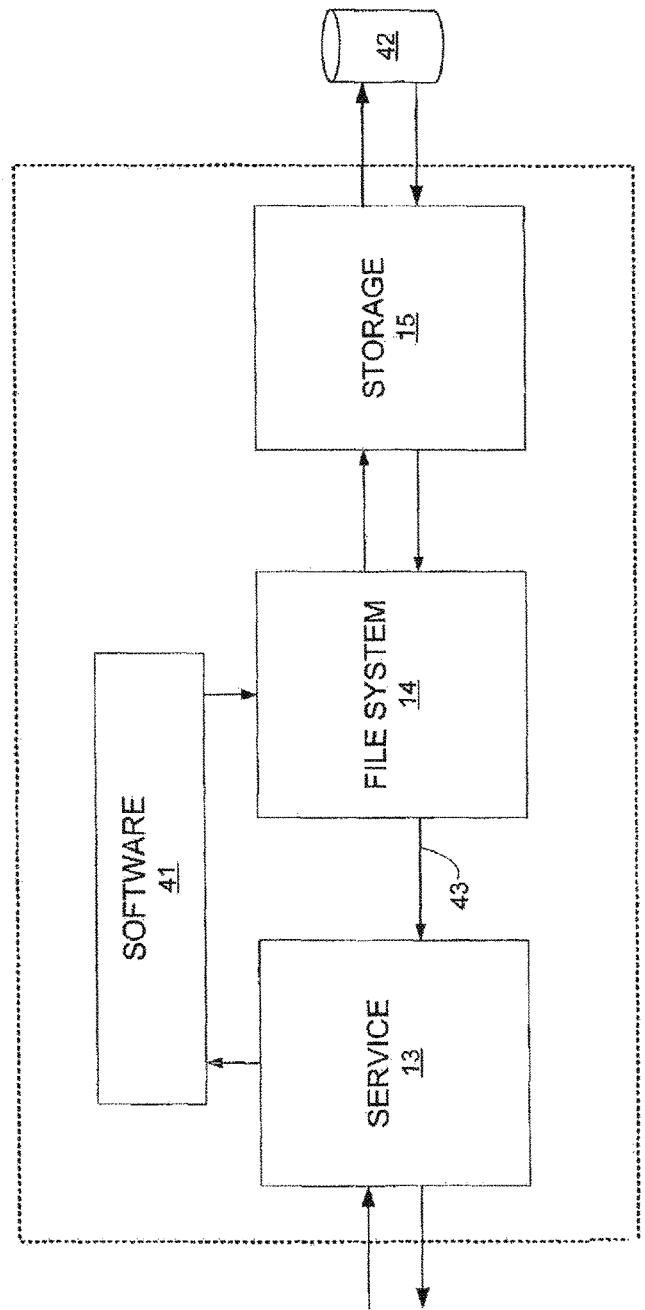
FIG. 5 is a block diagram showing how control flow may be used in embodiments of the present invention to permit automatic response by the file service module to a network request without intervention of software control.

FIG. 5 is a block diagram showing how control flow may be used in embodiments of the present invention to permit automatic response by the file service module to a network request without prior intervention of software control. In FIG. 5, there is shown service module 13, file system module 14, and storage module 15, as in FIG. 2, with service module 13 and file system module 14 under the control of software 41 and with storage module 15 in communication with storage arrangement 42. The connections between blocks represent control flows rather than data flows. On identification of a file service request by service module 13, the request is typically passed from the service module 13 to software control 41, for example, to handle security and other complex tasks. Then under software control 41, the request is processed by the file system module 14. On the other hand, the response to a file system request, which is not necessarily as complex, is routed from the file system module 14 directly back to the service module 13 over control flow 43 rather than being routed back through software control 41. The software control 41 is eventually informed that the request has been satisfied.

Figure 6:
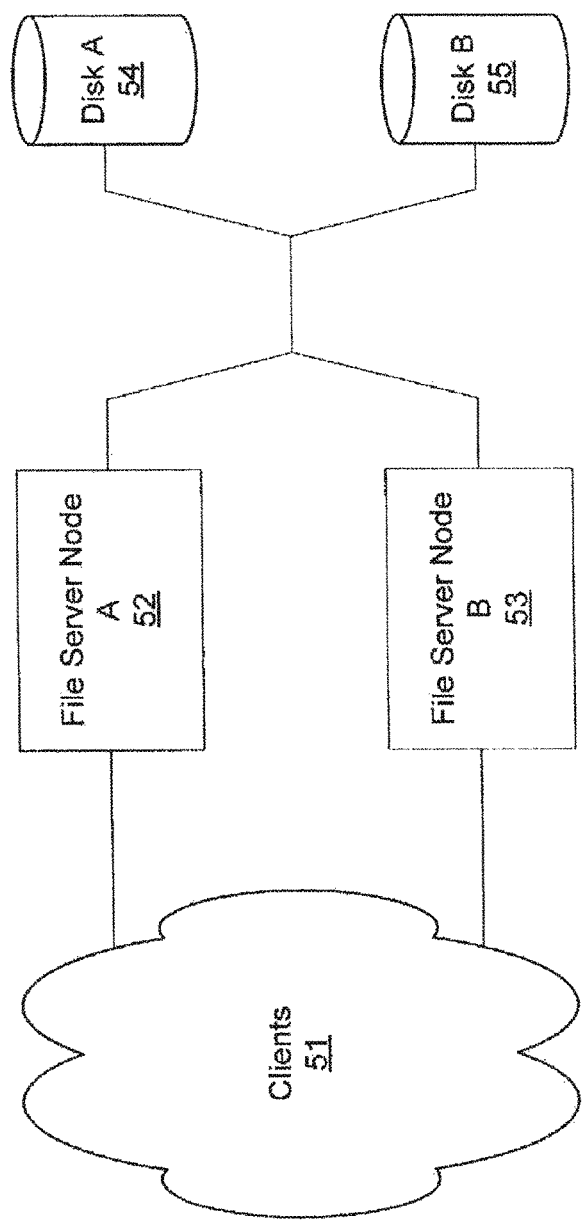
FIG. 6 is a block diagram of a clustered file server arrangement embodying sector cache locking in accordance with an embodiment of the present invention.

In a cluster of file server nodes accessing common storage, it is necessary to deal with instances wherein multiple nodes may seek to perform conflicting tasks with respect to a common storage location. FIG. 6 is a block diagram of a clustered file server arrangement having sector cache locking in accordance with one exemplary embodiment of the present invention. In this embodiment, file server node A (item 52) and file server node B (item 53), are both in communication with clients 51 and are configured so that each server node may access (that is, read from and write to) both disk A (item 54) and disk B (item 55). Disks A and B are arbitrary storage designators, and are not limited to single disks and also include the use of several disks, or a particular region on a single disk drive, and the mode of storage is any device suitable for, including but not limited to, magnetic and magneto-optical.

When file server systems are clustered, non-volatile storage may be mirrored using a switch to achieve a virtual loop. FIG. 7 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). The Non-Volatile Storage Processing sub-modules 326 interface with associated non-volatile storage (called NVRAM in FIG. 4) to provide a method for recovery in the event of power interruption or other event that prevents cached data—which is slated for being saved to disk—from actually being saved to disk. Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all filesystem changes that have been requested by the processor but have not yet been stored on disk in a checkpoint are stored in NVRAM by the Non-Volatile Storage Processing sub-module. In order to prevent overflow of NVRAM, a checkpoint is forced to occur, for example, whenever the amount of data in NVRAM has reached a pre-determined threshold. A checkpoint is only valid until the next checkpoint has been created, at which point the earlier checkpoint is no longer considered current.

Exemplary Filesystem

Figure 8:
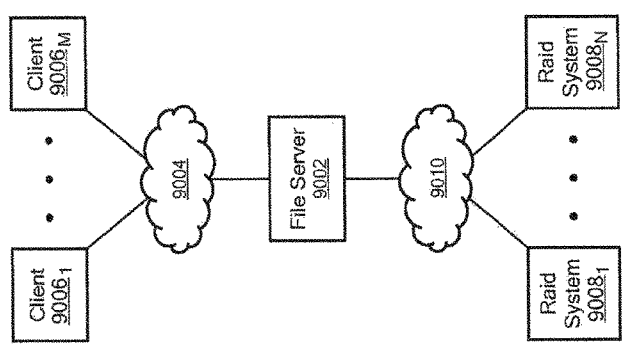
FIG. 8 is a schematic block diagram of a file storage system in accordance with an exemplary embodiment of the present invention.

FIG. 8 is a schematic block diagram of a file storage system in accordance with an exemplary embodiment of the present invention. The file storage system in FIG. 8 is also described in WO 2012/071335 and U.S. application Ser. No. 13/301,241 entitled "File Cloning and De-Cloning in a Data Storage System", which was filed on Nov. 21, 2011, and are incorporated herein by reference.

Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more).

Filesystem Tree Structure

The file server 9002 stores various types of objects in the filesystem. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

Figure 9:
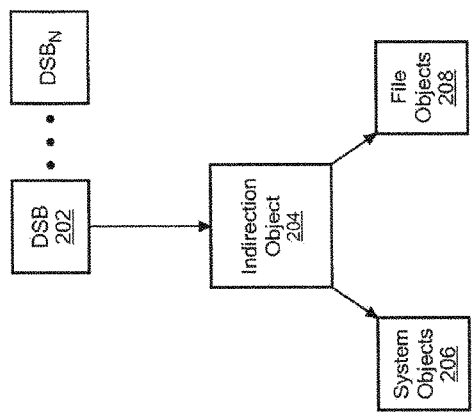
FIG. 9 is a schematic block diagram showing the general format of a filesystem in accordance with an exemplary embodiment of the present invention.

An instantiation of the filesystem is managed using a tree structure having root node (referred to as a dynamic superblock or DSB) that is preferably stored at a fixed location within the storage system. Among other things, storing the DSB at a fixed location makes it easy for the file server 9002 to locate the DSB. The file server 9002 may maintain multiple DSBs to store different versions of the filesystem representing different checkpoints (e.g., a current "working" version and one or more "checkpoint" versions). In an exemplary embodiment, the DSB includes a pointer to an indirection object (described in detail below), which in turn includes pointers to other objects. FIG. 9 is a schematic block diagram showing the general format of a filesystem instantiation in accordance with an exemplary embodiment of the present invention. The DSB 202 is a special structure that represents the root of the filesystem tree structure. Among other things, the DSB 202 includes a pointer to an indirection object 204, which in turn includes pointers to other objects in the filesystem including system objects 206 and file objects 208.

In embodiments of the present invention, N dynamic superblocks (N>2) are maintained for a filesystem, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information is stored in each dynamic superblock:

The checkpoint number associated with this dynamic superblock.

The handle of the modified checkpoint objects list object for this checkpoint.

The object number of the modified retained objects list object from the last retained checkpoint.

The state of this checkpoint (i.e., whether or not a checkpoint has been created).

A CRC and various other information to allow the DSB and other structures (e.g., the indirection object) to be checked for validity.

In an exemplary embodiment, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

Object Tree Structure

Generally speaking, each object in the filesystem, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 10:
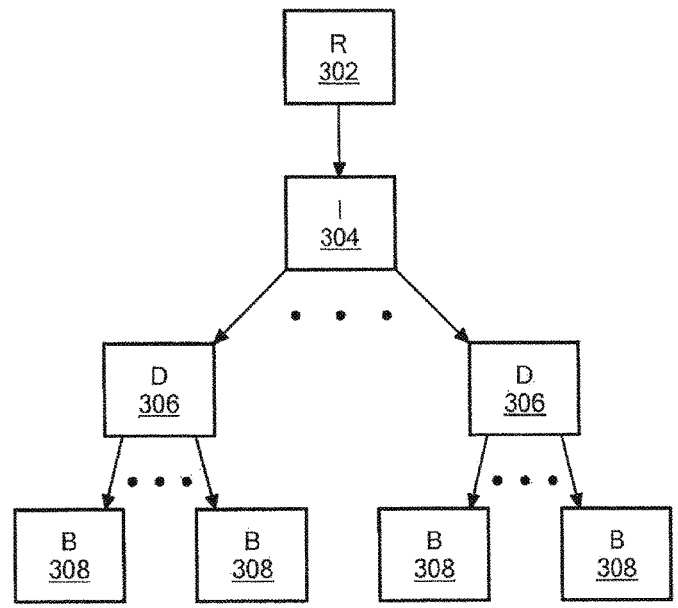
FIG. 10 is a schematic block diagram showing the general format of an object tree structure in accordance with an exemplary embodiment of the present invention.

FIG. 10 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

Figure 11:
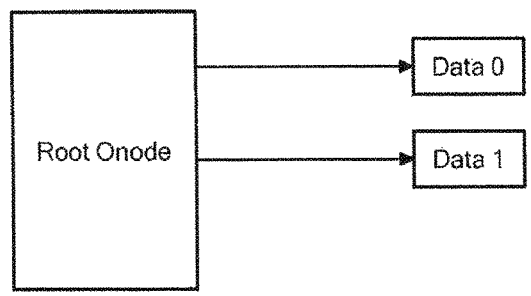
FIG. 11 is a block diagram showing use of a root onode with no other onodes in accordance with an exemplary embodiment of the present invention.

As data is added to the object, it is first of all put into data blocks pointed to directly from the root node. This is illustrated in the diagram of FIG. 11, showing use of a root node with no other nodes. Note that, for the sake of simplicity in this and all the following diagrams, the root node and direct node are shown as having only two data pointers, and the indirect node is shown as only having two indirect or direct node pointers.

Figure 12:
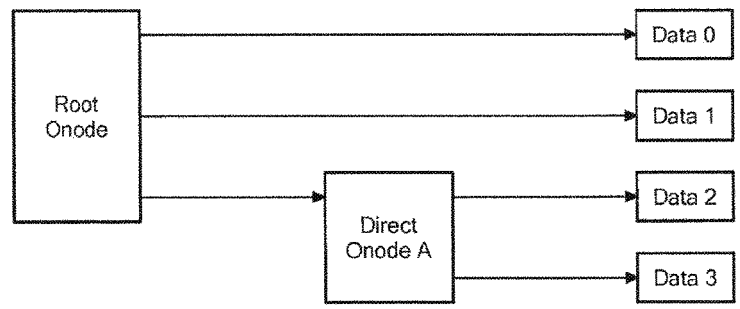
FIG. 12 is a block diagram showing employment of a root onode with a direct onode in accordance with an exemplary embodiment of the present invention.

Once all the direct block pointers in the root node are filled, then a direct node A is created with a pointer from the root node to the direct node. FIG. 12 shows employment of a root node with this direct node A. Note that the root node has multiple data block pointers but only a single pointer to either a direct or an indirect node.

Figure 13:
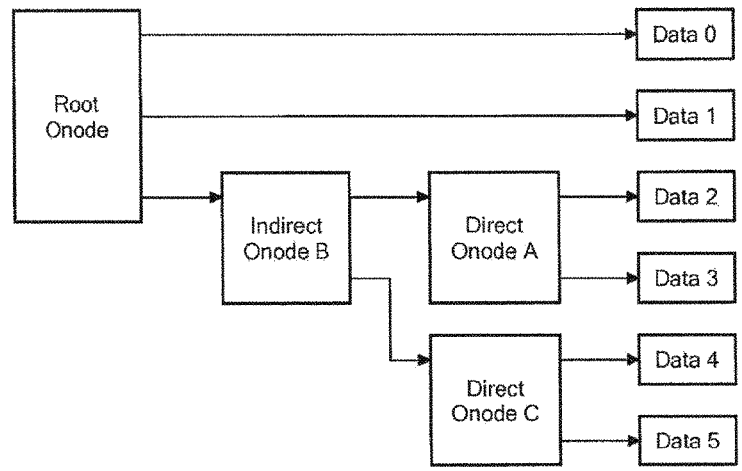
FIG. 13 is a block diagram showing employment of a root onode with an indirect onode as well as direct onodes in accordance with an exemplary embodiment of the present invention.

If the data in the object grows to fill all the data pointers in the direct node, then an indirect node B is created, as illustrated in FIG. 13. FIG. 13 shows employment of a root node with an indirect node as well as direct nodes. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Figure 14:
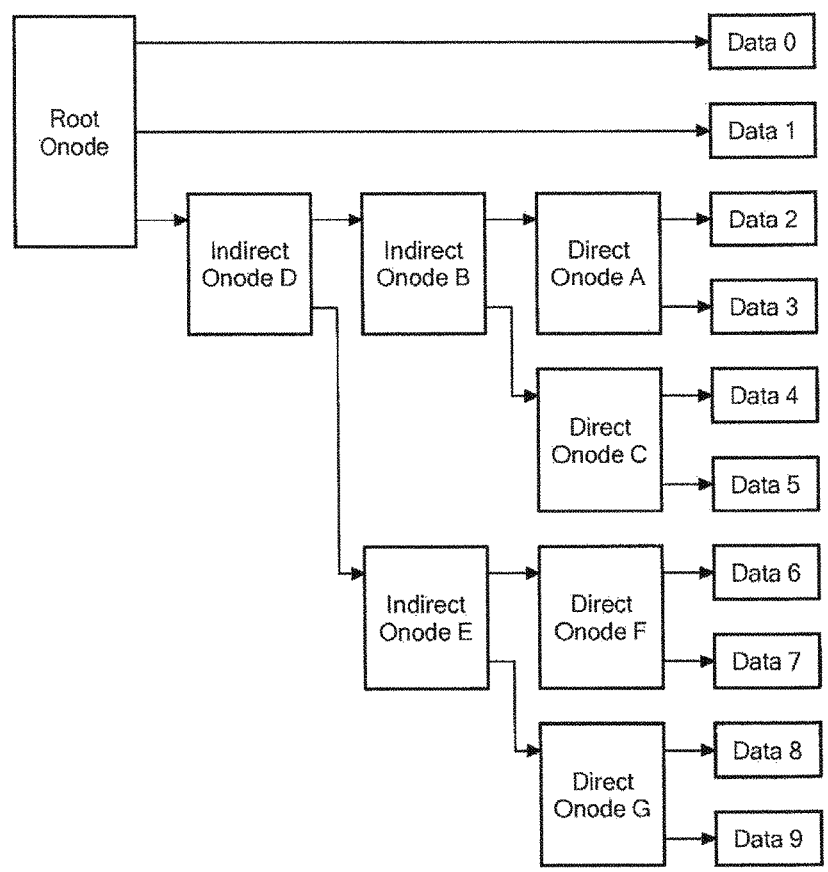
FIG. 14 is a block diagram illustrating use of multiple layers of indirect onodes placed between the root onode and the direct onodes in accordance with an exemplary embodiment of the present invention.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 14, which illustrates use of multiple layers of indirect nodes placed between the root node and the direct nodes.

This process of adding indirect nodes to create more levels of indirection is repeated to accommodate however much data the object contains.

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node. Also in the object root node is a parameter to identify the type of object for which the object root node is providing metadata. The object type may, for example, be any of a free space object, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation.

Node structure may also be established, in an exemplary embodiment, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an exemplary embodiment, a portion of the object root node is reserved for storage of file attributes.

More generally, the following structures for storage of file attributes are defined in an exemplary embodiment:

enode (little overhead to update, limited capacity). This structure is defined in the object root node and is 128 bytes in an exemplary embodiment.

software metadata object (expensive in overhead to update, near infinite capacity). This is a dedicated object for storage of metadata and therefore has its own storage locations on disk; the object is identified in the enode.

Thus, in an exemplary embodiment, each object root node stores the following types of information:

The checkpoint number.
The data length for this version of the object.
The number of levels of indirection used in the runlist for this object.
The type of the object. This is primarily used as a sanity check when a request comes in to access the object.
A pointer to an older root node version made for a retained checkpoint (if there is one).
A pointer to a newer root node version (will only be valid if this is a copy of a root node made for a retained checkpoint).
Up to 16 data block pointers per root onode. Each data block descriptor includes a pointer to a data block, the checkpoint number, and a bit to say whether the block is zero filled.
A single pointer to either a direct node or an indirect node.
The 128 bytes of enode data for this object.
A CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment:
The checkpoint number.
Pointers to either indirect or direct nodes (e.g., up to 60 such pointers).
A CRC and various sanity dwords to allow the indirect node to be checked for validity.

As discussed above, the direct node provides direct pointers to data blocks on the disk. The following information is stored in the direct node in an exemplary embodiment:
The checkpoint number.
A number of data block descriptors (e.g., up to 62 such descriptors). Each data block descriptor includes a pointer to a data block, the checkpoint number, and a bit to say whether the block is zero filled.
A CRC and various sanity dwords to allow the indirect node to be checked for validity.

As data is deleted from the object and data blocks and direct and indirect nodes are no longer required, they are returned to the free space allocation controller.

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

FIG. 15 shows a representation of object number assignments for an exemplary embodiment of the present invention. Specifically, the filesystem may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

In an exemplary embodiment, the indirection object 204 is logically organized as a table, with one table entry per object indexed by object number. As shown in FIG. 16, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

In an exemplary embodiment, the indirection object may be implemented as a "pseudo-file" having no actual storage blocks. In an exemplary embodiment, instead of having pointers to actual data blocks in the object tree structure (e.g., as shown in FIG. 9), such pointers in the indirection object tree structure point to the root nodes of the corresponding objects. Thus, in an exemplary embodiment, the indirection object maps each object number to the sector address of the root node associated with the corresponding filesystem object. The indirection object tree structure can then be traversed based on an object number in order to obtain a pointer to the root node of the corresponding object.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 17:
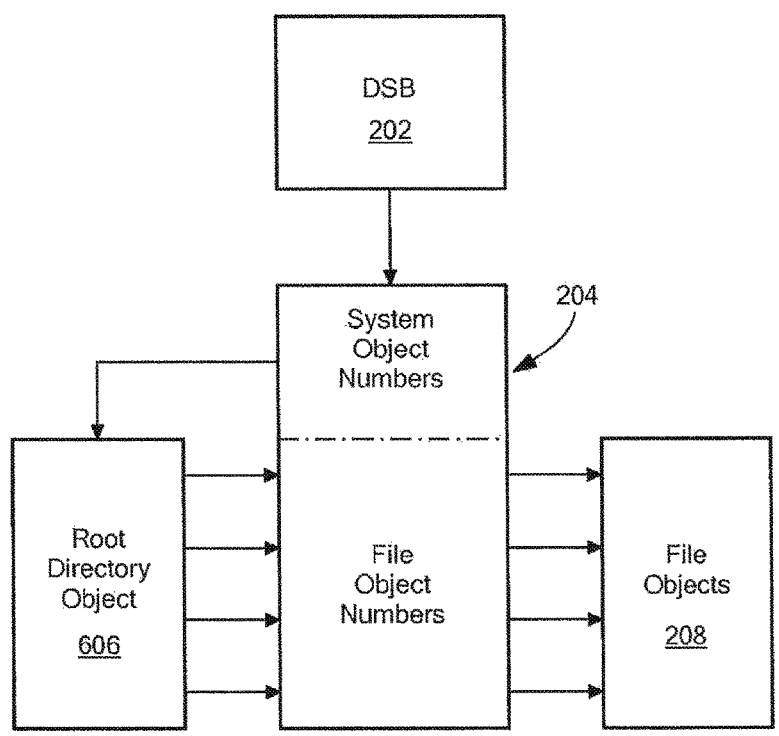
FIG. 17 is a schematic block diagram demonstrating the general relationship between the DSB, the indirection object, the root direction object, and the file objects, in accordance with an exemplary embodiment of the present invention.

FIG. 17 is a schematic block diagram demonstrating the general relationship between the DSB 202, the indirection object 204, the root directory object 606, and the file objects 208, in accordance with an exemplary embodiment of the present invention.

As mentioned above, an entry in the indirection object maps the root directory object number to the disk address of the root directory object's root node, the root directory object maps file names to object numbers, and the indirection object maps object numbers to objects. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

Multi-Way Checkpoints

In certain embodiment, multiple checkpoints may be taken so that multiple versions of the filesystem can be maintained over time. For example, multiple separate root structures (referred to hereinafter as "dynamic superblocks" or "DSBs") are used to manage multiple instantiations of the filesystem. The DSBs are preferably stored in fixed locations within the storage system for easy access, although the DSBs may alternatively be stored in other ways. There are typically more than two DSBs, and the number of DSBs may be fixed or variable. There is no theoretical limit to the number of DSBs (although there may be practical limits for various implementations). In this way, if it becomes necessary or desirable to revert the filesystem back to a previous "checkpoint," there are multiple "checkpoints" from which to choose, providing a better chance that there will be an intact version of the filesystem to which the filesystem can be reverted or a checkpoint that contains a particular version of the filesystem.

With respect to each successive checkpoint, there is stored, on disk, current file structure information that supersedes previously stored file structure information from the immediately preceding checkpoint. Checkpoints are numbered sequentially and are used to temporally group processing of file requests.

As discussed above, exemplary embodiments of the present invention maintain N DSBs (where N is greater than two, e.g., 16). The DSBs are used to take successive checkpoints.

Thus, at any given time, there is a current (working) version of the filesystem and one or more checkpoint versions of the filesystem. Because the storage system is typically quite dynamic, the current version of the filesystem will almost certainly begin changing almost immediately after taking a checkpoint. For example, filesystem objects may be added, deleted, or modified over time. In order to maintain checkpoints, however, none of the structures associated with stored checkpoints can be permitted to change, at least until a particular checkpoint is deleted or overwritten. Therefore, as objects in the current version of the filesystem are added, deleted, and modified, new versions of object tree structures are created as needed, and the various pointers are updated accordingly.

Figure 18:
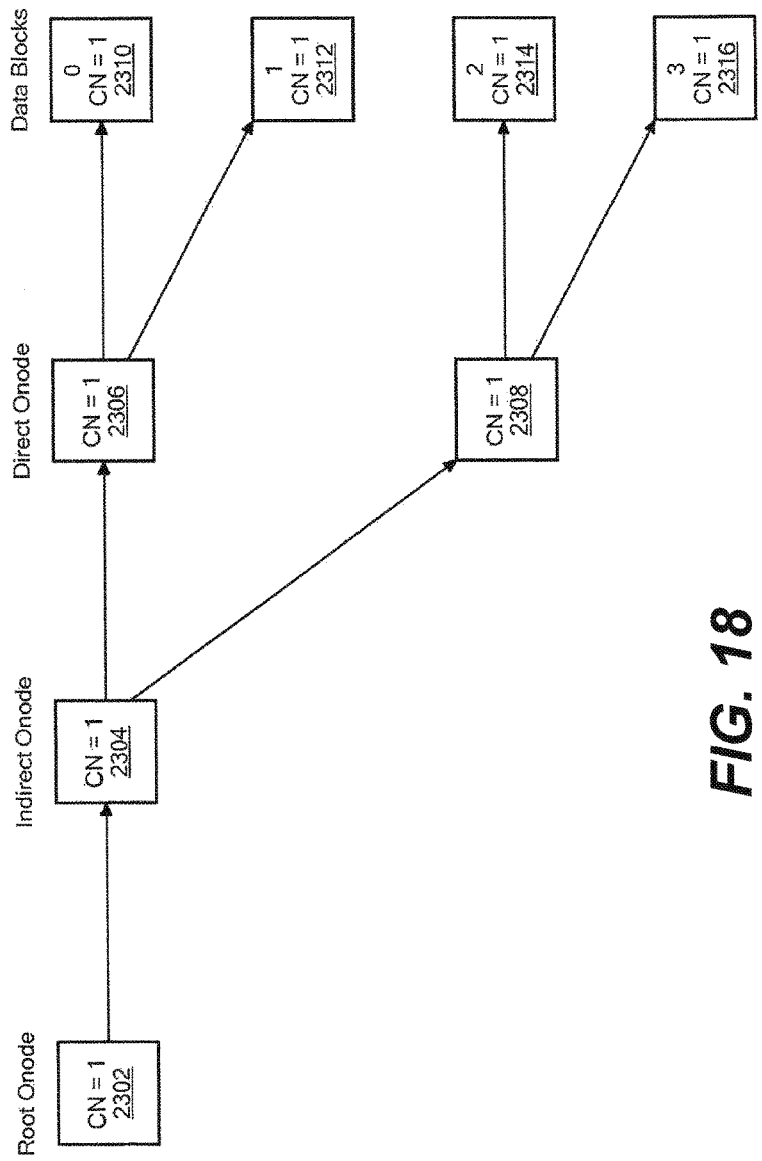
FIG. 18 is a schematic diagram that shows the structure of an exemplary object that includes four data blocks and various onodes at a checkpoint number 1 in accordance with an exemplary embodiment of the present invention.

For example, FIG. 18 schematically shows an object structure for an exemplary object that was created at a checkpoint number 1. The object includes four data blocks, namely data block 0 (2310), data block 1 (2312), data block 2 (2314), and data block 3 (2316). A direct node 2306 includes a pointer to data block 0 (2310) and a pointer to data block 1 (2312). A direct node 2308 includes a pointer to data block 2 (2314) and a pointer to data block 3 (2316). An indirect node 2304 includes a pointer to direct node 2306 and a pointer to direct node 2308. A root node 2302 includes a pointer to indirect node 2304. All nodes and all data blocks are marked with checkpoint number 1.

Figure 19:
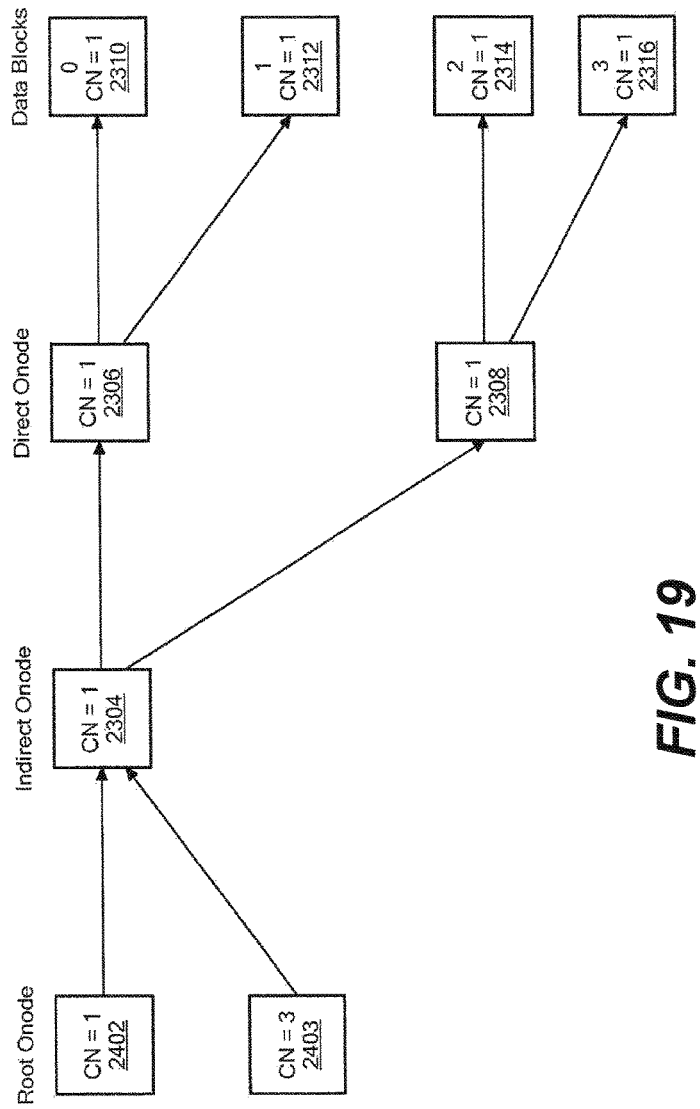
FIG. 19 is a schematic diagram that shows the structure of the exemplary object of FIG. 18 after a new root node is created for the modified object in accordance with an embodiment of the present invention.

Suppose now that data block 0 (2310) is to be modified in checkpoint number 3. Since root node 2402 is part of an earlier checkpoint, it cannot be modified. Instead, the Object Store sub-module of the file server 9002 saves a copy of the old root node 2302 to free space on the disk and marks this new root node with checkpoint number 3 (i.e., the checkpoint at which it was created). FIG. 19 schematically shows the object structure after creation of the new root node 2403. At this point, both root node 2402 and new root node 2403 point to indirect node 2304.

Figure 20:
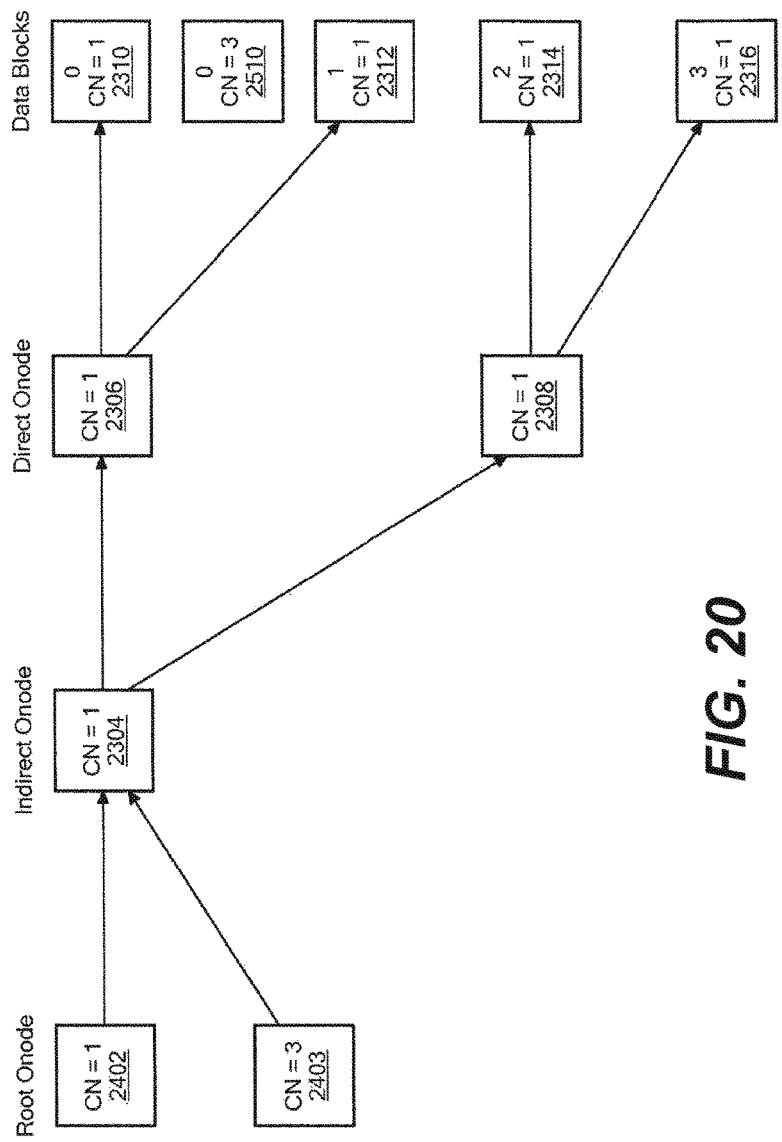
FIG. 20 is a schematic diagram that shows the structure of the exemplary object of FIG. 19 after a modified copy of a data block is created in accordance with an embodiment of the present invention.

The Object Store sub-module then traverses the object structure starting at the root node until it reaches the descriptor for data block 0 (2310). Since data block 0 (2310) is part of an earlier checkpoint, it cannot be modified. Instead, the Object Store sub-module creates a modified copy of data block 2310 in free space on the disk and marks this new data block with checkpoint number 3 (i.e., the checkpoint at which it was created). FIG. 20 schematically shows the object structure after creation of the new data block 2510.

Figure 21:
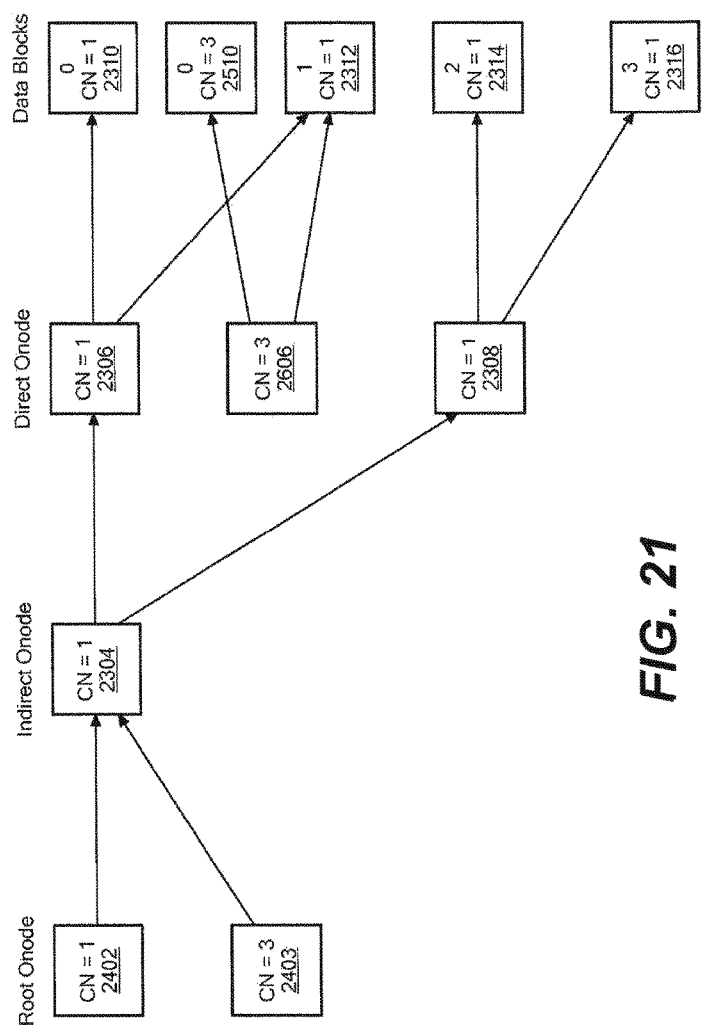
FIG. 21 is a schematic diagram that shows the structure of the exemplary object of FIG. 20 after a new direct onode is created to point to the modified copy of the data block in accordance with an embodiment of the present invention.

The Object Store sub-module now needs to put a pointer to the new data block 2510 in a direct node, but the Object Store sub-module cannot put a pointer to the new data block 2510 in the direct node 2306 because the direct node 2306 is a component of the earlier checkpoint. The Object Store sub-module therefore creates a modified copy of direct node 2306 to free space on the disk including pointers to the new data block 0 (2510) and the old data block 1 (2312) and marks this new direct node with checkpoint number 3 (i.e., the checkpoint at which it was created). FIG. 21 schematically shows the object structure after creation of the new direct node 2606 including pointers to the new data block 0 (2510) and the old data block 1 (2312).

Figure 22:
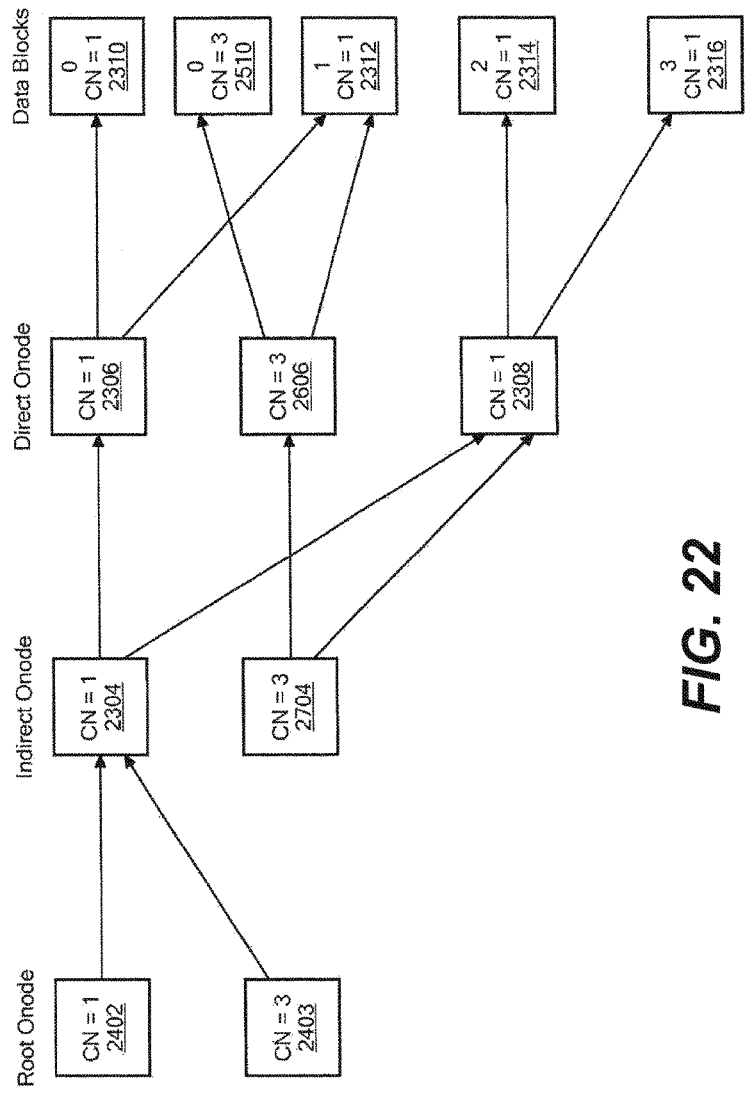
FIG. 22 is a schematic diagram that shows the structure of the exemplary object of FIG. 21 after a new indirect onode is created to point to the new direct onode in accordance with an embodiment of the present invention.

The Object Store sub-module now needs to put a pointer to the new direct node 2606 in an indirect node, but the Object Store sub-module cannot put a pointer to the new direct node 2606 in the indirect node 2304 because the indirect node 2304 is a component of the earlier checkpoint. The Object Store sub-module therefore creates a modified copy of indirect node 2304 with pointers to the new direct node 2606 and the old direct node 2308. FIG. 22 schematically shows the object structure after creation of the new indirect node including pointers to the new direct node 2606 and the old direct node 2308.

Figure 23:
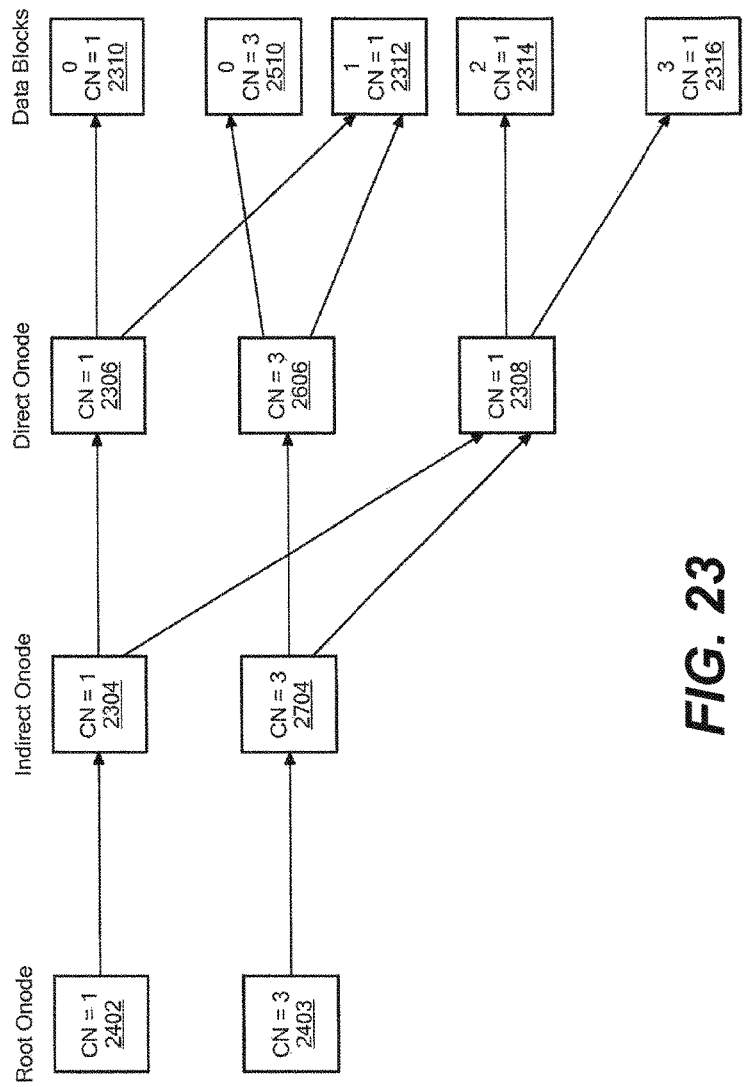
FIG. 23 is a schematic diagram that shows the structure of the exemplary object of FIG. 22 after the new root node is updated to point to the new indirect onode in accordance with an embodiment of the present invention.

Finally, the Object Store sub-module writes a pointer to the new indirect node 2704 in the new root node 2403. FIG. 23 schematically shows the object structure after the pointer to the new indirect node 2704 is written into the new root node 2403.

It should be noted that, after modification of data block 0 is complete, blocks 2402, 2304, 2306, and 2310 are components of the checkpoint 1 version but are not components of the current checkpoint 3 version of the object; blocks 2308, 2312, 2314, and 2316 are components of both the checkpoint 1 version and the current checkpoint 3 version of the object; and blocks 2403, 2704, 2606, and 2510 are components of the current checkpoint 3 version of the object but are not components of the checkpoint 1 version.

It should also be noted that the new node do not necessarily need to be created in the order described above. For example, the new root node could be created last rather than first.

Thus, when a filesystem object is modified, the changes propagate up through the object tree structure so that a new root node is created for the modified object. A new root node would only need to be created for an object once in a given checkpoint; the new root node can be revised multiple times during a single checkpoint.

In order for the new version of the object to be included in the current version of the filesystem, the current indirection object is modified to point to the root node of the modified object rather than to the root node of the previous version of the object. For example, with reference again to FIG. 23, the current indirection object would be updated to point to root node 2403 rather than to root node 2402 for the object number associated with this object.

Similarly, if a new object is created or an existing object is deleted in the current version of the filesystem, the current indirection object is updated accordingly. For example, if a new object is created, the indirection object is modified to include a pointer to the root node of the new object. If an existing object is deleted, the indirection object is modified to mark the corresponding object number as free.

Since the indirection object is also a tree structure having a root node, modification of the indirection object also propagates up through the tree structure so that a new root node would be created for the modified indirection object. Again, a new root node would only need to be created for the indirection object once in a given checkpoint; the new root node can be revised multiple times during a single checkpoint.

Thus, when a new version of the indirection object is created during a particular checkpoint, the DSB associated with that checkpoint is updated to point to the new root node for the modified indirection object. Therefore, each version of the filesystem (i.e., the current version and each checkpoint version) generally will include a separate version of the indirection object, each having a different indirection object root node (but possibly sharing one or more indirect nodes, direct nodes, and/or data blocks).

Figure 24:
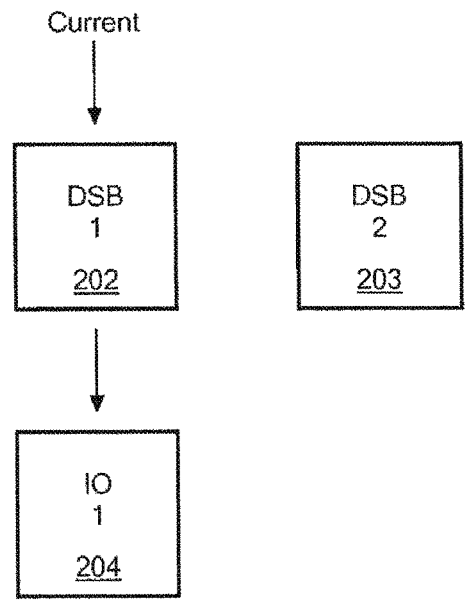
FIG. 24 is a schematic diagram showing various filesystem structures prior to the taking of a checkpoint, in accordance with an exemplary embodiment of the present invention using a circular list of DSBs to record checkpoints.

FIG. 24 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

Figure 25:
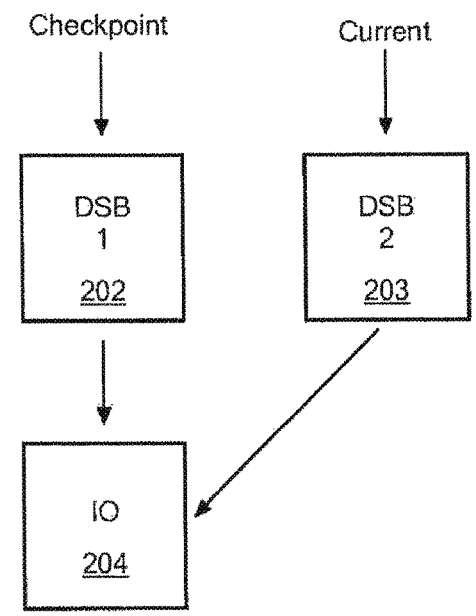
FIG. 25 is a schematic diagram showing the various filesystem structures of FIG. 24 after a checkpoint is taken, in accordance with an exemplary embodiment of the present invention using a circular list of DSBs to record checkpoints.

In order to create a checkpoint from the current version of the filesystem, the next DSB in the circular list (i.e., DSB 203 in this example) is initialized for the new checkpoint. Among other things, such initialization includes writing the next checkpoint number into DSB 203 and storing a pointer to the root node of indirection object 204 into DSB 203. FIG. 25 is a schematic diagram showing the various filesystem structures after a checkpoint is taken, in accordance with an exemplary embodiment of the present invention. At this point, DSB 202 represents the most recent checkpoint version of the filesystem, while DSB 203 represents the current (working) version of the filesystem.

Figure 26:
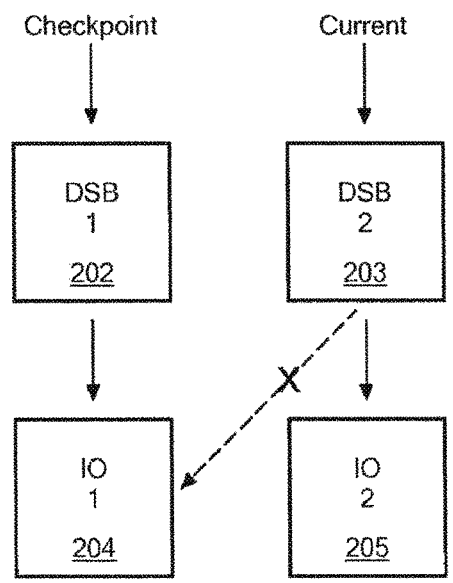
FIG. 26 is a schematic diagram showing the various filesystem structures of FIG. 25 after modification of the indirection object, in accordance with an exemplary embodiment of the present invention using a circular list of DSBs to record checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 25, such that a new indirection object root node is created, the DSB for the current filesystem version (i.e., DSB 203 in FIG. 25) is updated to point to the new indirection object root node rather than to the prior indirection object root node. FIG. 26 is a schematic diagram showing the various filesystem structures after modification of the indirection object, in accordance with an exemplary embodiment of the present invention. Here, DSB 202, which is associated with the checkpoint version of the filesystem, points to the checkpoint version of the indirection object 204, while DSB 203, which is associated with the current version of the filesystem, points to the root node of new indirection object 205.

Figure 27:
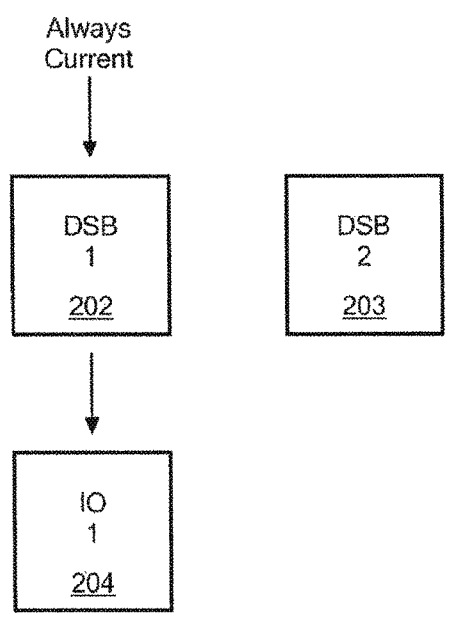
FIG. 27 is a schematic diagram showing various filesystem structures prior to the taking of a checkpoint, in accordance with an exemplary embodiment of the present invention in which one DSB is reused to create successive checkpoints.

FIG. 27 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

In order to create a checkpoint from the current version of the filesystem, the next DSB 203 is initialized for the new checkpoint. Among other things, such initialization includes writing the next checkpoint number into DSB 203 and storing a pointer to the root node of indirection object 204 into DSB 203. FIG. 25 is a schematic diagram showing the various filesystem structures after a checkpoint is taken, in accordance with an exemplary embodiment of the present invention. At this point, DSB 203 represents the most recent checkpoint version of the filesystem, while DSB 202 continues to represent the current (working) version of the filesystem.

Figure 28:
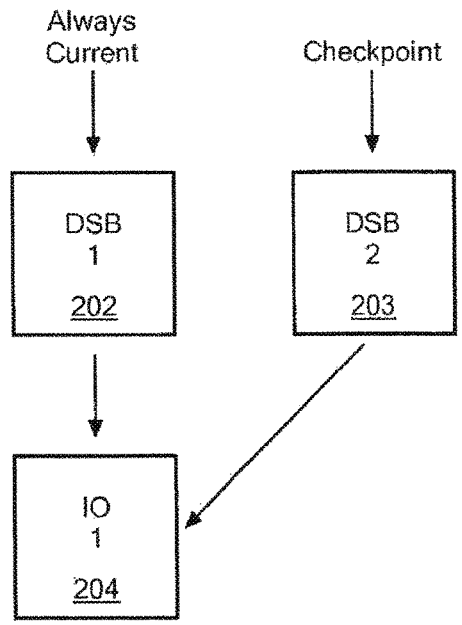
FIG. 28 is a schematic diagram showing the various filesystem structures of FIG. 27 after a checkpoint is taken, in accordance with an exemplary embodiment of the present invention in which one DSB is reused to create successive checkpoints.
Figure 29:
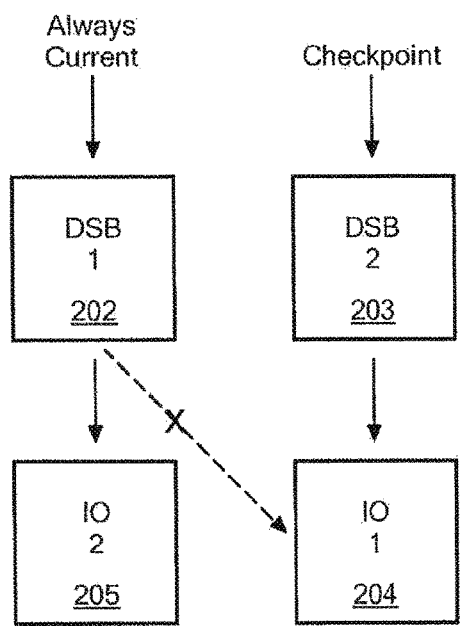
FIG. 29 is a schematic diagram showing the various filesystem structures of FIG. 28 after modification of the indirection object, in accordance with an exemplary embodiment of the present invention in which one DSB is reused to create successive checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 28, such that a new indirection object root node is created, the DSB for the current filesystem version (i.e., DSB 202 in FIG. 28) is updated to point to the new indirection object root node rather than to the prior indirection object root node. FIG. 29 is a schematic diagram showing the various filesystem structures after modification of the indirection object, in accordance with an exemplary embodiment of the present invention. Here, DSB 203, which is associated with the checkpoint version of the filesystem, points to the checkpoint version of the indirection object 204, while DSB 202, which continues to be associated with the current version of the filesystem, points to the root node of new indirection object 205.

File Cloning

The process of file cloning is explained in U.S. patent application Ser. No. 10/286,015, which is incorporated by reference above. Relevant portions of the process are reprinted below from U.S. patent application Ser. No. 10/286,015 and some portions are omitted. According to an embodiment of the present invention, file cloning is performed according to the following process.

In certain embodiments of the present invention, a file cloning mechanism is employed to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. Some characteristics of such file cloning include:

The data stream of a filesystem object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied. A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In exemplary embodiments, a file system object is cloned by first creating a new object that represents a read-only clone (snapshot) of the source object, referred to hereinafter as a "data-stream-snapshot" object or "DSS," and then creating a mutable clone of the object. The block pointers and onode block pointer in the root onode of the clone objects are initially set to point to the same blocks as the source object. Certain metadata from the source object (e.g., file times, security, etc.) and named data streams are not copied to the clone object. Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the filesystem users. Both the source object and the mutable clone object effectively become writable versions of the DSS object and effectively store their divergences from the DSS object.

Before creating the data-stream-snapshot object, the system preferably ensures that the source object is quiescent. In an exemplary embodiment, this involves the following steps:

Step A1. Lock the source object against mutations.

Step A2. Perform a filesystem checkpoint, which effectively serializes the creation of clones on a given filesystem (although the creation rate will be limited by the rate at which the filesystem can commit the previous checkpoint to disk such that storage-side delays will result in longer create times). As explained below, in some embodiments, a filesystem checkpoint is not necessary in order to clone the object.

Then, after completion of the checkpoint, the system creates the data-stream-snapshot object, which involves the following steps:

Step A3. Create a data-stream-snapshot object.

Step A4. Copy the block pointers from the source object's root onode to the data-stream-snapshot object's root onode.

Step A5. Record the current checkpoint number in the source object's root onode. This is the object's cloned-in-checkpoint number ("CCN"); it defines the earliest checkpoint in which the object's data stream can diverge from its associated data-stream-snapshot object's data stream.

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4a. Associate the new data-stream-snapshot object with the source file's current data-stream-snapshot object.

Step A4b. Record the source file's current cloned-in-checkpoint number in the new data-stream-snapshot object's root onode.

Further objects that have a mutable clone of the data-stream-snapshot object's data stream can be created as follows:

Step B1. Create a new file system object.

Step B2. Copy the block pointers from the data-stream-snapshot object's root onode to the new object's root onode.

Step B3. Record the current checkpoint number in the new object's root onode.

Step B4. Record the handle of the data-stream-snapshot object in the new object's metadata.

Step B5. Increment the data-stream-snapshot object's reference count and add the new object's handle to the data-stream-snapshot object's list of references.

It should be noted that the cloned-in-checkpoint number (CCN) is distinct from an object's checkpoint number (labelled "CN" in FIG. 18), which records the checkpoint of the last modification of the object. Both are stored in the object root onode.

When modifying a user data or metadata block, the filesystem considers whether the block has already diverged from the clone object's associated data-stream-snapshot object, when deciding whether the block must be written to new space:

A change to a user/metadata block through a pointer with a checkpoint number less than the clone's clone-in-checkpoint number (an un-diverged block) must be written to new space.

A change to a user/metadata block through a pointer with a checkpoint number greater than or equal to the clone's cloned-in-checkpoint number (a diverged block) follows the usual rules for objects in the "live" filesystem substantially as described above.

Some of the file cloning concepts described above can be demonstrated by the examples in U.S. patent application Ser. No. 10/286,015, which is incorporated by reference above.

Figure 30:
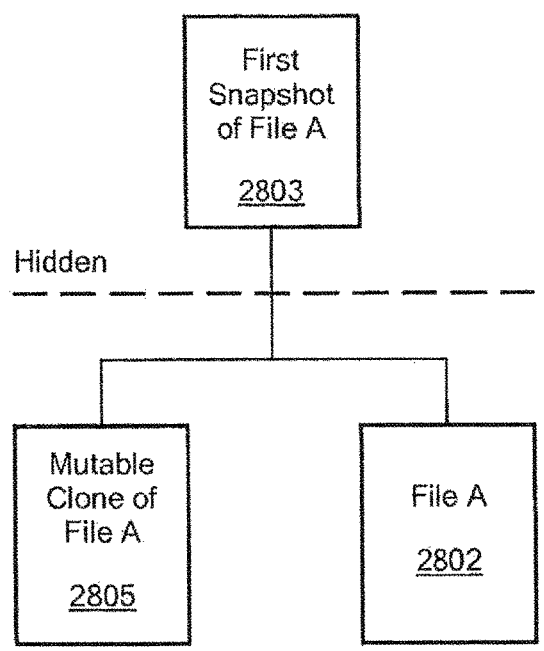
FIG. 30 schematically shows the relationship between the source object (FileA) 2802, the hidden data-stream-snapshot object 2803, and the mutable copy 2805, in accordance with an exemplary embodiment of the present invention.

FIG. 30 schematically shows the relationship between the source object (FileA) 2802, the hidden data-stream-snapshot object 2803, and the mutable clone 2805, in accordance with an exemplary embodiment of the present invention.

As is apparent from the following description of exemplary embodiments of the present invention, modifications to the cloning and checkpointing mechanisms described above are implemented.

Figure 31:
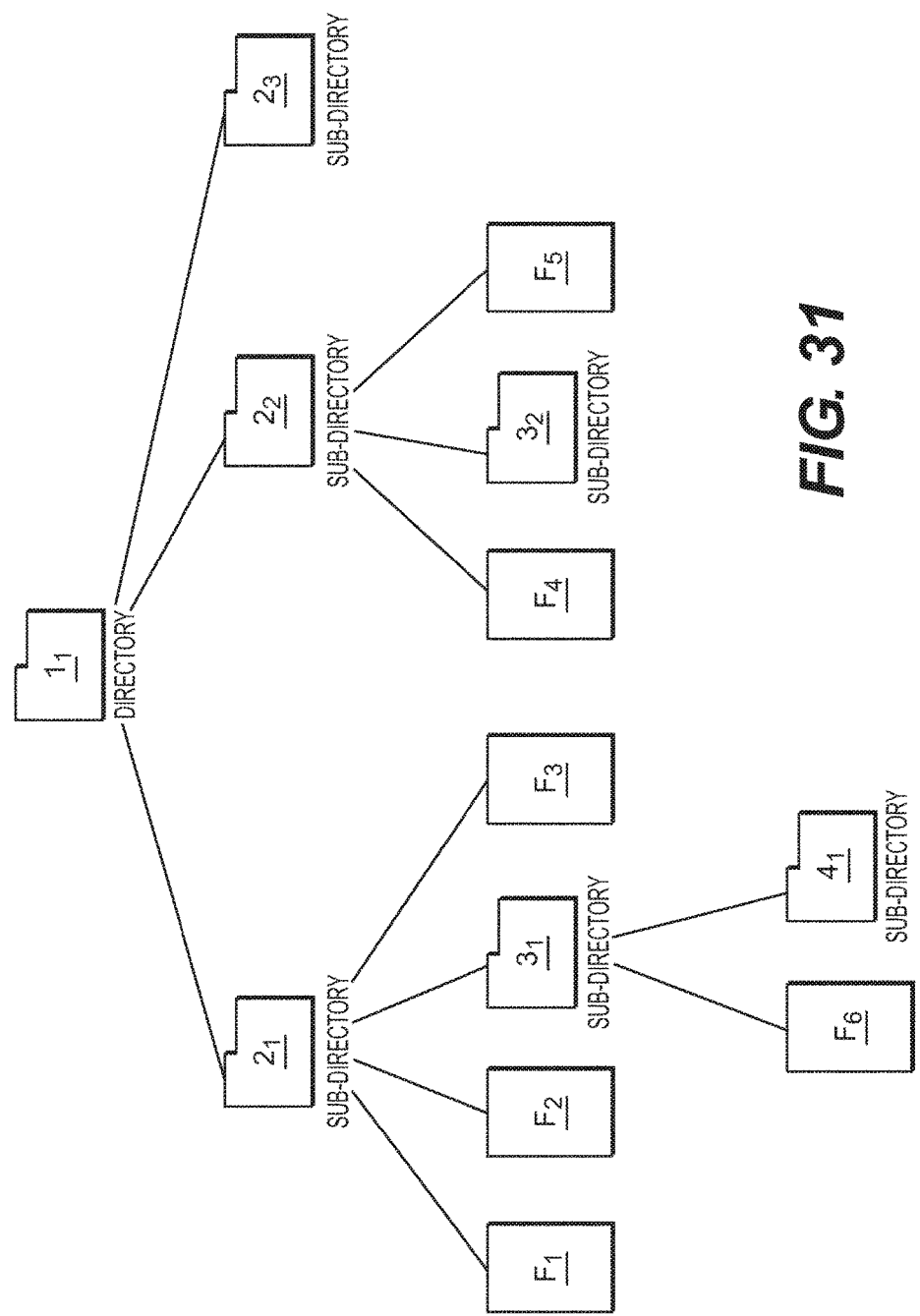
FIG. 31 schematically shows a directory structure according to an exemplary embodiment of the present invention.

FIG. 31 schematically shows a directory structure according to an exemplary embodiment of the present invention which is represented as a tree structure having a plurality of branches. The file system 14 in FIG. 1 can contain, for example, one or more directories (otherwise referred to as folders or first objects) which allow the user to group files (otherwise referred to as second objects) into separate collections and each of the directories may also contain one or more additional directories contained therein (otherwise referred to as a subdirectory). Accordingly, in FIG. 31, a directory which is labeled $1_1$ may be a root directory in the file system 14 or may alternatively be a subdirectory which is contained by a parent directory in the file system 14.

In FIG. 31, the directory $1_1$ includes multiple subdirectories $2_1$, $2_2$, and $2_3$. Though not shown in FIG. 31, the directory $1_1$ may directly store one or more files along with the subdirectories $2_1$, $2_2$, and $2_3$. The subdirectory $2_1$ contains files $F_1$, $F_2$, $F_3$ and subdirectory $3_1$. The subdirectory $2_2$ contains files $F_4$ and $F_5$, and subdirectory $3_2$. Further, the subdirectory $3_1$ contains a file $F_6$ and a subdirectory $4_1$. Though not shown in FIG. 31, the subdirectories $2_3$, $3_2$ and $4_1$ could each contain additional files and subdirectories in a hierarchical manner.

The embodiments of the present invention apply a depth first directory traversal (otherwise herein referred to as crawling) to build a queue of work required to fulfill a directory copy request. FIGS. 32 to 36 show an exemplary application of one depth first directory traversal algorithm to the directory structure shown in FIG. 31. However, the present invention should not be limited to the depth first traversal shown in FIGS. 32 to 36 and it will be understood by those skilled in the art that other depth first traversal algorithms can be implemented instead. FIG. 37 shows the relationship over time of the main queue 800 as the directory in FIG. 31 is subjected to a depth first traversal to build the queue of work (main queue 800) required to fulfill the directory copy request of directory $1_1$, from a host, for example.

Figure 32:
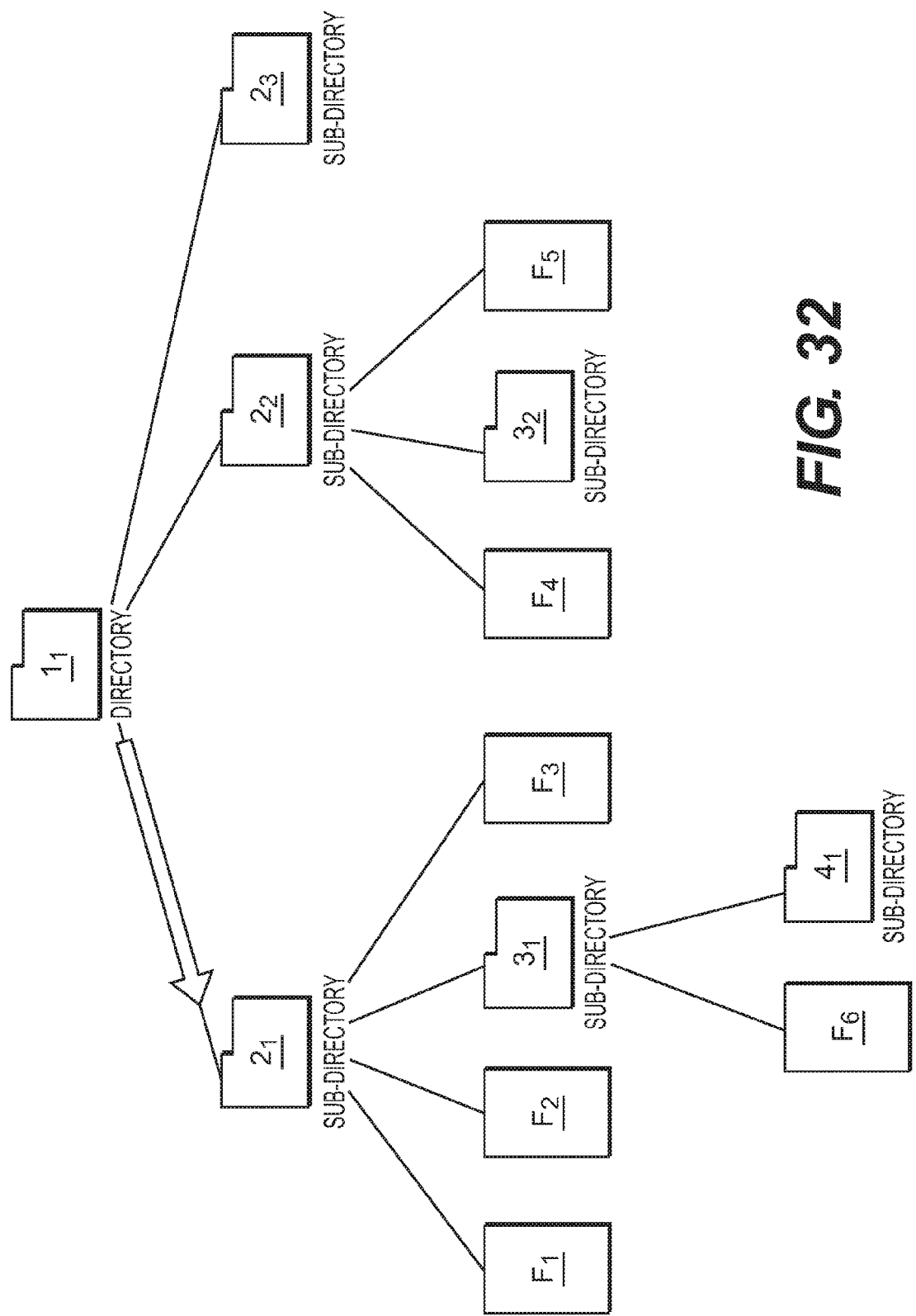
FIG. 32 schematically shows a first step in a depth-first traversal of the directory structure shown in FIG. 31 according to an exemplary embodiment of the present invention.

FIG. 32 schematically shows the first step in a depth-first traversal of the directory structure shown in FIG. 31 according to an exemplary embodiment of the present invention. It is assumed that the directory $1_1$ has a structure exactly as shown in FIG. 31 and the server has received a request to clone this directory tree. It then creates a directory work item for directory $1_1$ and pushes it to the main queue 800 at time $t_0$ as shown in the table of FIG. 37.

At any given time the tree-cloning worker pool consists of a number of busy workers and idle workers. An idle worker will spring into action as soon as there is a work item in the main queue. Once it completes its task, it will go back to the idle work pool. For simplicity the table in FIG. 37 assumes the pool has only one worker and the main queue has no limit on the number of work items.

The table shows that an idle worker detects a work item associated with the top-level directory $1_1$ at time $t_1$. It immediately pops it off the main queue and performs the task as listed in the three rightmost columns of the table: execute, push, and re-queue. The work item $1_1$ has state information that indicates a directory work item with the location of the last visited directory entry. Because this is the first time the top-level directory $1_1$ is processed, the worker opens the directory, reads its contents, and, for each directory entry, creates a new work item and pushes it to the main queue until it encounters a second subdirectory or the number of new file work items reaches a limit. Specifically, the worker creates a directory work item for directory $2_1$, pushes it to the main queue, then re-queues the current work item $1_1$ because it encounters a second subdirectory $2_2$. The new status of the main queue when the worker goes back to the idle worker pool at time $t_2$ is shown in the table, where the work item $2_1$ appears before $1_1$ because the priority of a subdirectory is always higher than that of its parent directory.

While FIG. 32 shows a singular application of depth-first traversal of the directory structure shown in FIG. 31, in various embodiments of the present invention, the depth-first traversal can be executed in the form of multiple worker threads. That is, it is preferable to improve the efficiency of the traversal of the directory to provide 'N' threads, where each thread will take turn popping off a work item from the main work queue to execute. If the work item is for a directory, this resulting in the worker incrementally traversing the directory tree originated from the subdirectory associated with the work item. This has the advantageous effects of decreasing the time needed to traverse the directory as well as avoiding memory shortages which can occur when attempting to traverse and/or copy large directories and/or clone large numbers of files.

FIG. 37 shows the state of the main queue 800 at various times assuming the worker pool for cloning has only one worker thread, (e.g., N=1), for simplicity. The first column shows the times. At each instant of time, the second column shows the list of work items in the order that they appear in the main queue, the third column the work item being executed by the worker, the fourth column the new work items the worker creates and pushes to the main queue, the last column whether the worker re-queues the currently executed work item. If the third column (labeled as "EXECUTE") is empty, it implies the worker thread is temporarily idle.

Figure 33:
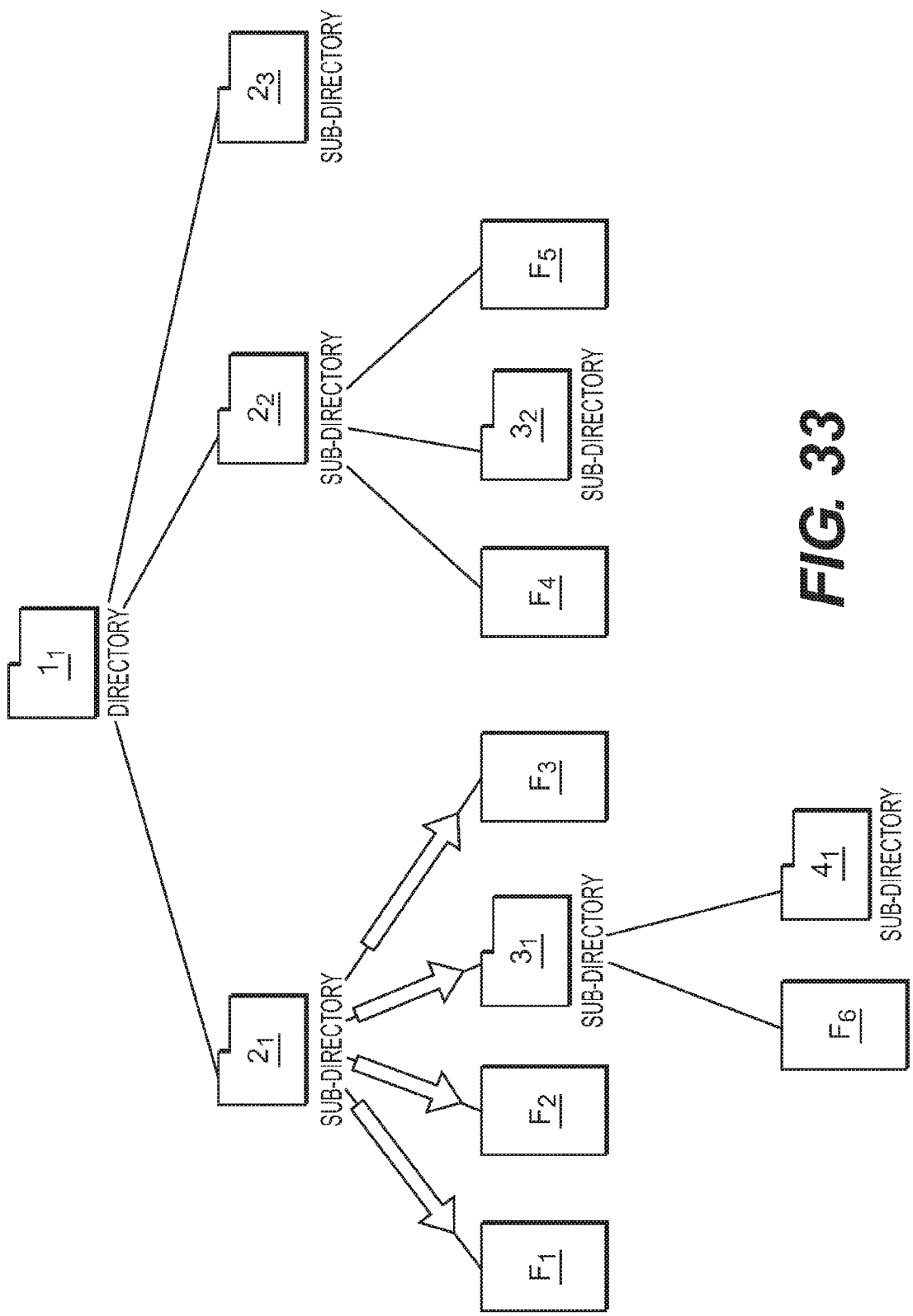
FIG. 33 schematically shows another step in a depth-first traversal of the directory structure shown in FIG. 31 according to an exemplary embodiment of the present invention.

FIG. 32 schematically shows the next step in a depth-first traversal of the directory structure shown in FIG. 31 after the directory $1_1$ is added to the main queue 800 according to an exemplary embodiment of the present invention. An idle worker detects a non-empty main queue at time $t_3$ and processes the main queue as described later with reference to FIGS. 38-41. It pops the first item $2_1$ off the queue and executes the task associated with it. Because $2_1$ is for a directory, the worker walks the list of the directory entries of $2_1$, creating and pushing two file work items for $F_1$, $F_2$, one directory work item for $3_1$, and one file work item for $F_3$. Because it reaches the end of the list before reaching the limit of new file work items or encountering a second subdirectory, it terminates its task and goes back to the idle worker pool at time $t_4$. The new state of the main queue at time $t_4$ is shown in the table in the order "$F_1$, $F_2$, $F_3$, $3_1$, $1_1$" because the main queue is a priority-based queue where files have the highest priority and subdirectories have higher priorities than their parents as shown in FIG. 33.

As soon as a new work item is pushed to the main queue, it will be immediately popped off the queue by an idle worker. Thus, in an embodiment with more than a single worker thread, such as the case that 5 idle workers are present, all work items "$F_1$, $F_2$, $F_3$, $3_1$, $1_1$" are popped off, one after another, without waiting for any work item to be completed. However, as shown in FIG. 37, it is assumed the worker pool has only one worker thread. Thus, the four work items $F_1$, $F_2$, $F_3$, $3_1$ are executed at different times $t_5 < t_6 < t_7 < t_8$ as shown in the table in FIG. 37.

Figure 34:
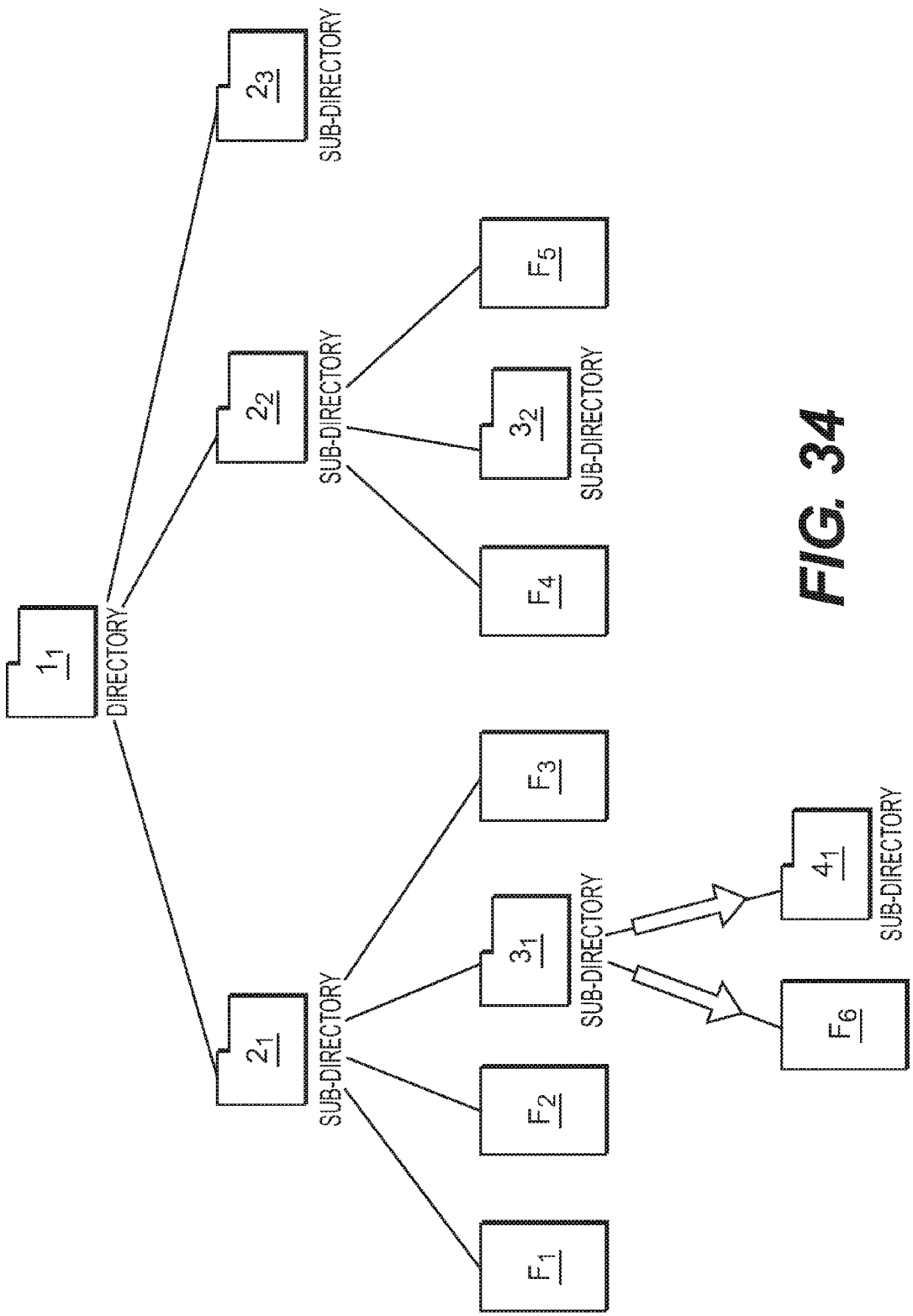
FIG. 34 schematically shows a further step in a depth-first traversal of the directory structure shown in FIG. 31 according to an exemplary embodiment of the present invention.

FIG. 34 schematically shows the task of the worker executing the directory work item $3_1$. Executing a directory work item means descending to the next directory level in a depth-first traversal of the directory. The worker walks the directory entries, creating new work items $F_6$, $4_1$ and pushing them to the main queue. It goes back to the idle worker pool at time $t_9$ without re-queuing the current work item $3_1$ because there are no other objects in the directory $3_1$ other than $F_6$ and $4_1$. The new status of the main queue at time $t_9$ is "$F_6$, $4_1$, $1_1$" because, again, files have the highest priority and subdirectories have higher priorities than their parents.

Figure 35:
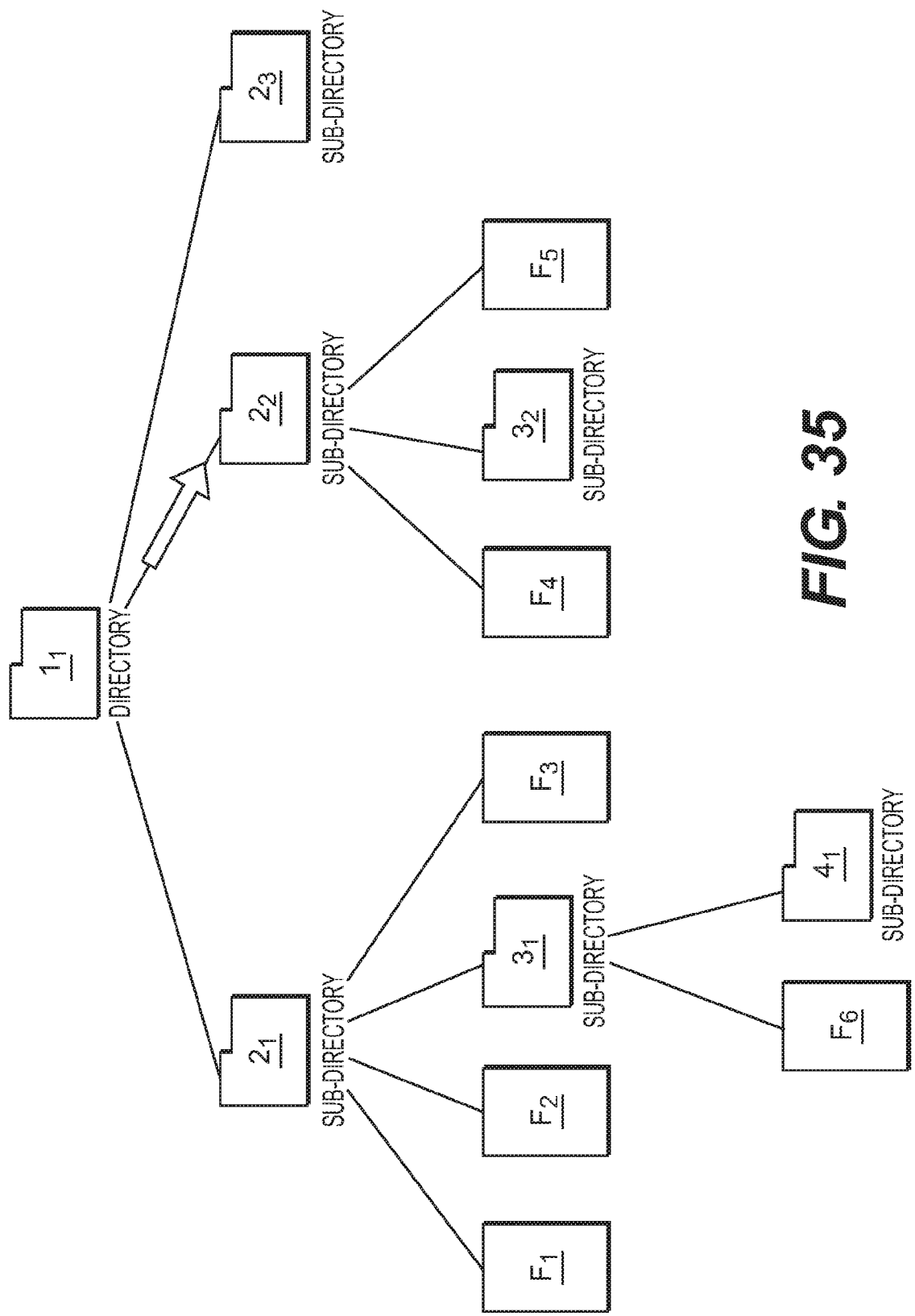
FIG. 35 schematically shows yet another step in a depth-first traversal of the directory structure shown in FIG. 31 according to an exemplary embodiment of the present invention.
Figure 36:
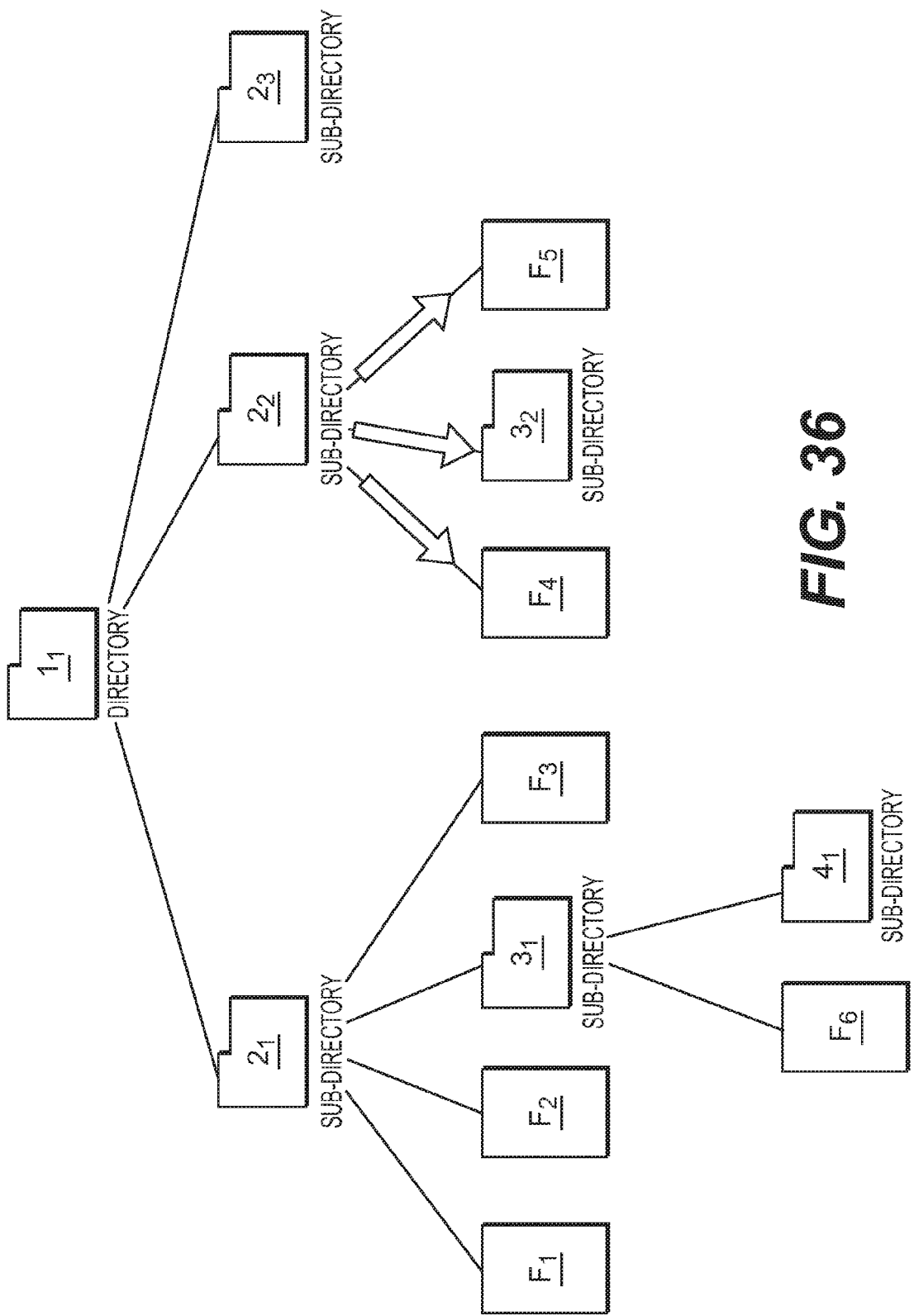
FIG. 36 schematically shows still another step in a depth-first traversal of the directory structure shown in FIG. 31 according to an exemplary embodiment of the present invention.

By the time the worker goes back to the idle worker pool after completing work item $4_1$, the main queue contains only work item $1_1$ because directory $4_1$ is empty and hence contributes no new work items. The next work item to be popped off is $1_1$, which corresponds to the top-level directory. This implies that one branch of the directory tree, namely, "$1_1/1_2$", has been completely traversed. FIG. 35 shows a worker executing work item "$1_1$". Because the directory work item contains state information, the worker knows to start at the next directory entry $2_2$. Thus, a new directory work item for $2_2$ is created and pushed on to the main queue, then the current work item $1_1$ is re-queued because the next directory entry $2_3$ is a subdirectory. When the worker goes back to the idle worker pool at time $t_{13}$, the new status of the main queue is "$2_2$, $1_1$" because the subdirectory $2_2$ has higher priority than its parent $1_1$.

FIG. 35 shows a worker executing work item $2_2$. It creates and pushes new work items $F_4$, $3_2$, and $F_5$, then goes back to the idle worker pool at time $t_{15}$. The new status of the work queue is "$F_4$, $F_5$, $3_2$, $1_1$". Continuing this cloning procedure, $F_4$ and $F_5$ will be cloned, then $3_2$ will be processed causing an end to the traversal of the branch "$1_1/2_2/3_2$" because the ending subdirectory $3_2$ is empty.

Next, an idle worker pops off the remaining item $3_2$ from the main queue at time $t_{19}$, which then creates a directory work item for $2_3$ and terminates at time $t_{20}$ because it reaches the end of the directory entries of $1_1$. Finally, when $2_3$ is popped of the main queue and contributes no new work items, the whole directory tree cloning process is completed because the main queue is empty.

Although the foregoing description is made with a general reference to a single worker thread for purposes of explanation, it may be preferable to provide the tree-cloning worker pool with more than one worker in order to increase processing efficiency. In such a case, the worker threads work independently of each other. As a result, all workers work in parallel, where each worker continuously repeats the cycle of popping up the work item at the front of the main queue and processing it. Depending on the nature of the work item, the worker will either clone it (for file objects), or create a new work item (for directories). All newly created work items are pushed to the main queue where they appear in the order dictated by their priority, not by the time they were pushed to the queue. As such, providing plural workers helps to empty the main queue faster, thus improving performance.

In addition, while the foregoing depth first traversal has been described with reference to the directory structure shown in FIG. 31, it will be understood by those skilled in the art that other depth first traversal algorithms can be implemented which may traverse and arrange the directory contents in other orders while remaining within the scope of the present invention. The application of other depth first traversal algorithms to the exemplary embodiments described herein is only limited in that it is preferable that the placement of files in the main queue 800 be given priority over directories while directories will be inserted into the main queue 800 with a priority greater than the respective parent directory. Therefore, with the foregoing traversal described above, a subdirectory will be added to the main queue 800 after the respective parent directory has already been added to the main queue 800 first and it will appear before its parent directory.

While FIGS. 31-37 are directed to describing the process of ordering the contents of a directory in what is referred to herein as the main queue 800, the following is directed to describing the detailed processing flow of executing a directory tree cloning request.

Figure 38:
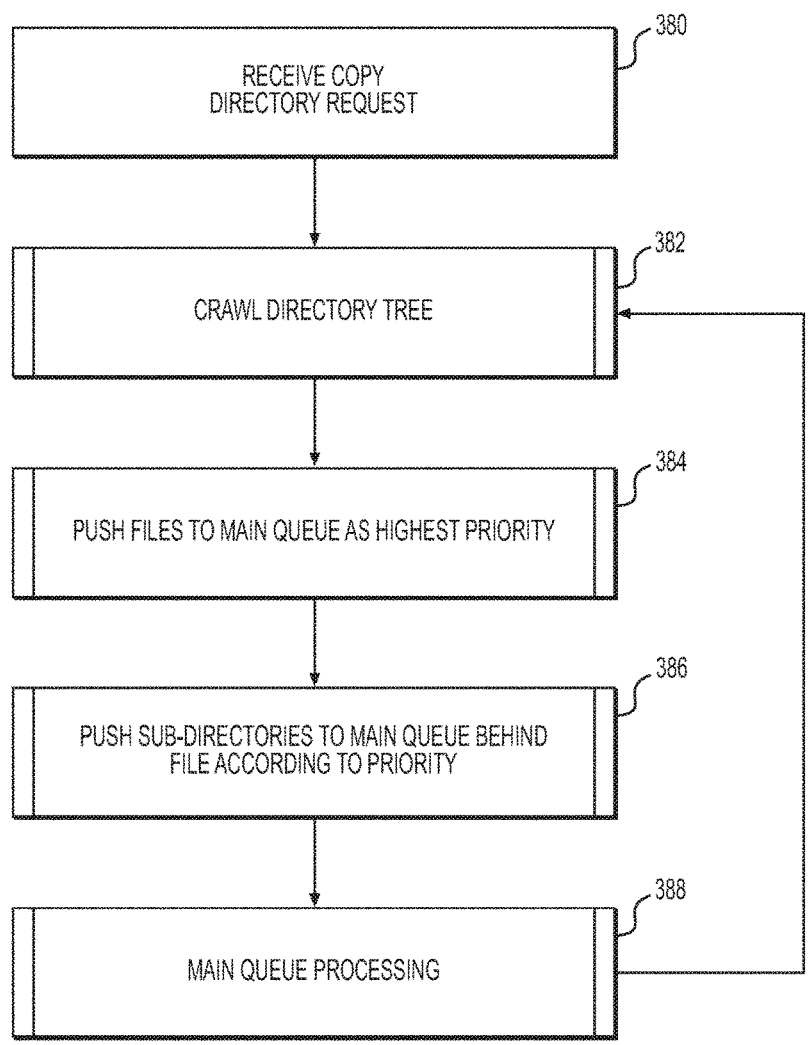
FIG. 38 schematically shows how a directory tree cloning request is converted to a directory work item in the main work queue according to an exemplary embodiment of the present invention.

FIG. 38 schematically shows an overall directory tree cloning processing flow according to an exemplary embodiment of the present invention. First, a directory tree cloning request is received at step 3801 which causes the server to first (i) create an empty destination directory at step 3802, then (ii) create a directory work item for the specified source directory at step 3803, and finally (iii) push the new work item to the main queue at step 3804. In general, if the server receives 'n' directory cloning requests simultaneously, there will be 'n' directory work items in the main queue initially. If a directory cloning request specifies 'k' source directories to be cloned, there will be 'k' directory work items in the main queue initially.

Figure 39:
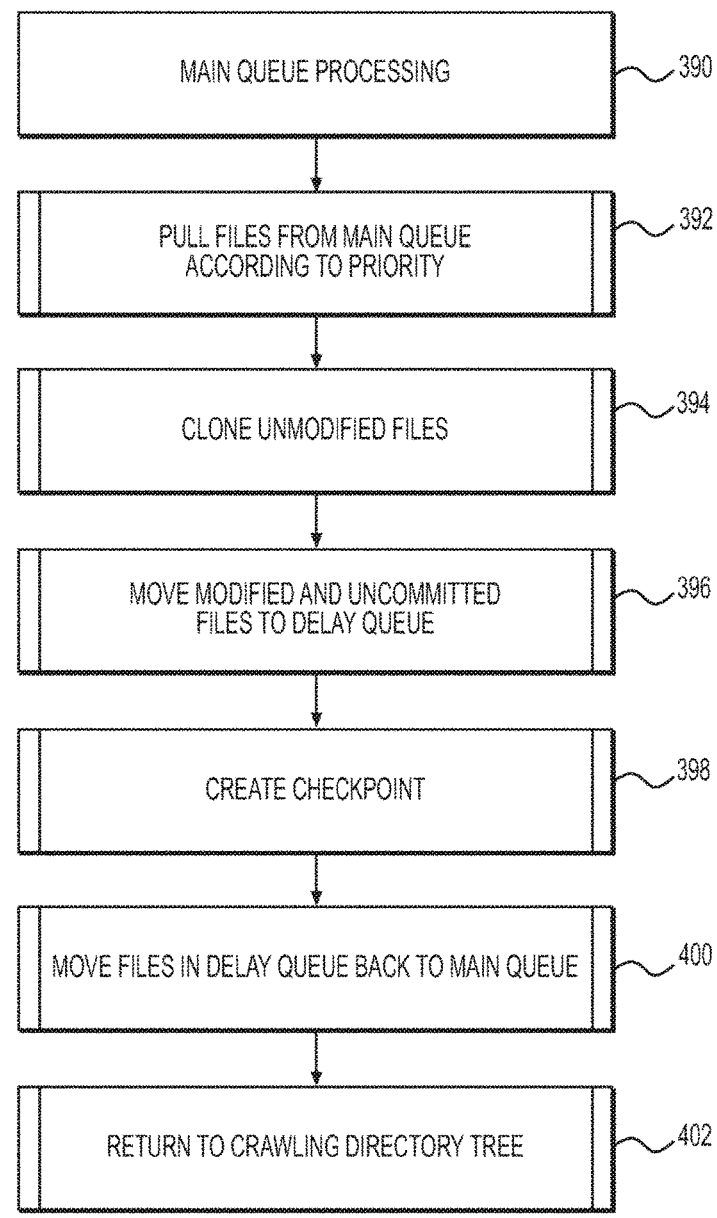
FIG. 39 schematically shows the processing flow of workers popping work items off the main queue one after another and the associated processing according to an exemplary embodiment of the present invention.

FIG. 39 schematically shows a pool of 'N' idle tree cloning workers 3901, 3902, 3903 in an idle worker pool 3900 waiting on work items to be pushed to the main work queue. Note that the server thread in FIG. 38 does not necessarily belong to this pool. As long as the main work queue 800 is non-empty, each idle worker from the pool 3900 will pop one work item off the main work queue 800 and process it as shown in steps 3905 to 3909. The worker will process it as shown in the detailed processing flows of FIG. 40 or 41 if the work item is for a directory as in step 3907 or a file as in step 3908 according to the determination in step 3906, respectively. Once done, the worker will go back to the idle pool 3900 and wait on the main work queue 800 again as in step 3909. If the main work queue 800 is non-empty, the whole process repeats. As can be seen from FIG. 39, the more workers dedicated to the tree-cloning worker pool 3900, the faster the main work queue 800 will be emptied and hence the tree cloning work will be completed sooner.

Figure 40:
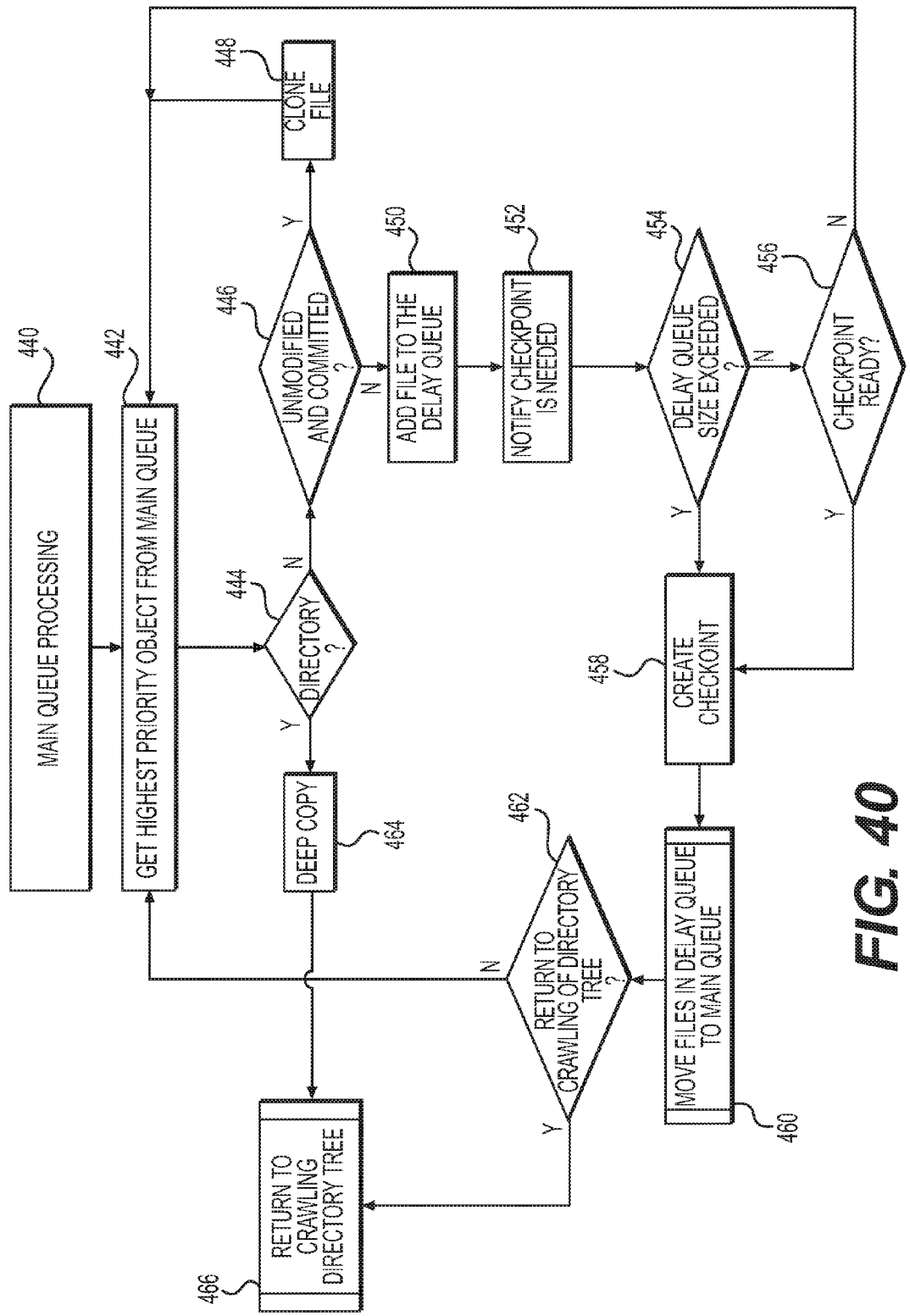
FIG. 40 schematically shows the detailed processing of a directory work item according to one exemplary embodiment of the present invention.

FIG. 40 schematically shows the work flow a worker will perform when processing a directory work item at step 4000. Initially, the file count 'F' is 0 and the (sub)directory count 'D' is 0 as shown at 4001 because no work items other than the work item corresponding to the directory tree cloning request exists on the main queue. The purpose of the work flow is to create an appropriate new file/directory work item for each entry encountered while walking the list of the directory contents. The total outstanding directory/file work items are tracked, and are denoted as $T_d$ and $T_f$, respectively. At step 4002, the next directory entry in the directory listing is read, and at step 4003 it is determined whether end of the directory contents listed in the directory listing has been reached. If the end of the directory contents is reached, the worker returns back to the idle pool at step 4004.

Otherwise, it is determined at step 4005 whether the object in the read directory entry is a directory or not. If the entry is a directory, the directory count D is incremented at step 4006. Next, it is determined if D is less than 2 at step 4008. If not, the worker will re-queue the currently processed work item at step 4011. If D is not less than 2, it is then determined whether outstanding directory work items $T_d$ is less than a directory limit $L_d$ at step 4010. If not, the result is treated as an error at step 4012 and a failure is issued for the entire tree cloning process. However, an elaborate scheme can be designed to avoid early failure by issuing a synchronous checkpoint and re-queuing the currently processed directory work item as long as there is progress in file cloning. This elaborate scheme is not shown in FIG. 40. Any elaborate scheme to avoid early failure is considered within the scope of this invention. If $T_d$ is less than a directory limit $L_d$ at step 4010, the processing is performed as shown at step 4014. Specifically, an empty sub-directory at the directory copying destination is created, a directory work item is created, and the created work item is pushed to the main queue 800 before reading the next directory entry at step 4002.

At step 4005, if the entry is not a directory, the processing proceeds to step 4007 where a file work item is created, the file count F is incremented, and the created work item is pushed to the main queue 800. At step 4009, it is determined whether the number of file work items created so far in this iteration reaches the iteration limit $L_i$, or if the total outstanding file work items $T_f$ reaches the file limit $L_f$, whichever occurs first. If neither has occurred, the processing returns to step 4002. Otherwise, the worker will re-queue the currently processed work item at step 4011. In FIG. 40, steps 4008 and 4009 directly contribute to the depth-first traversal of the directory tree.

Figure 41:
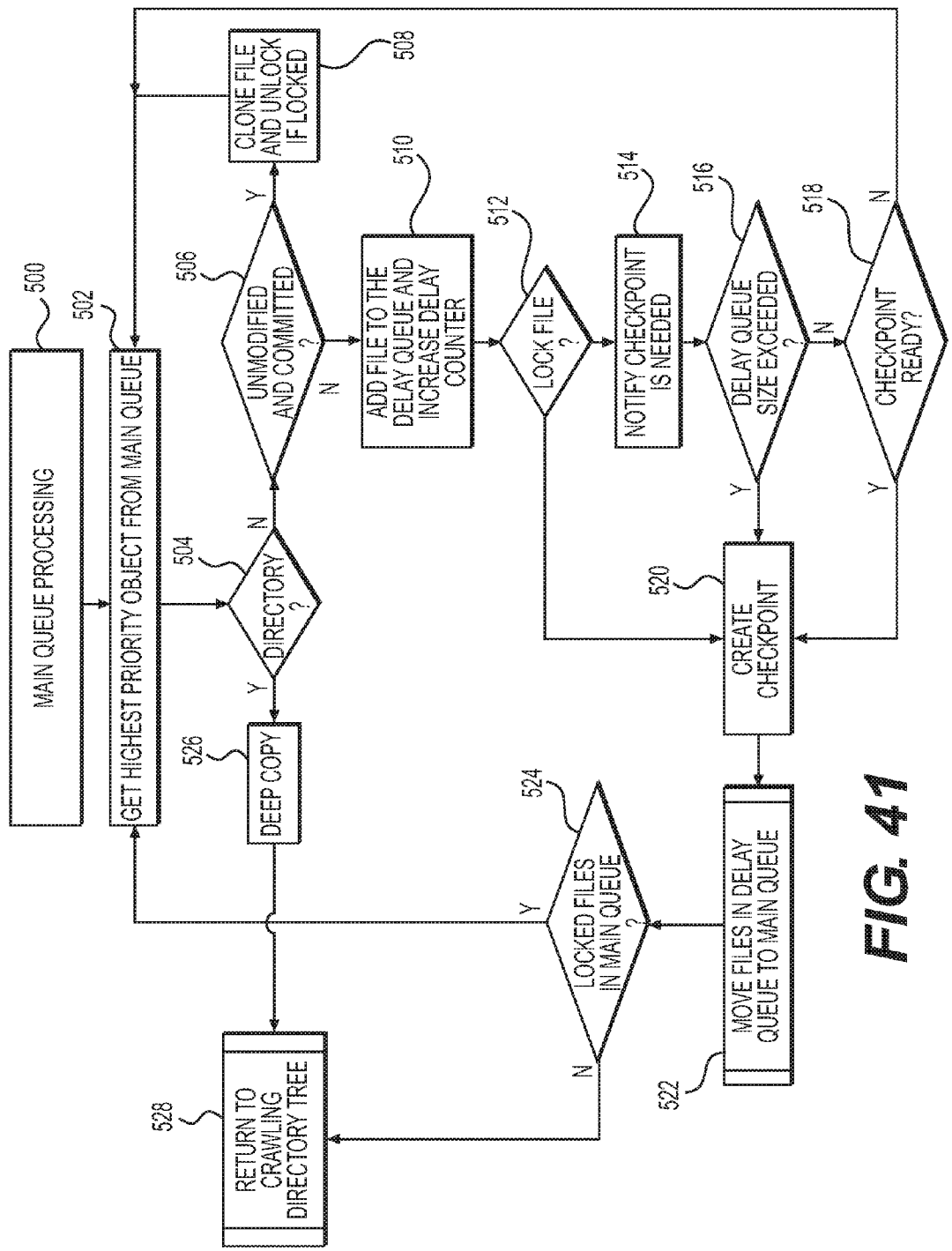
FIG. 41 schematically shows the detailed processing of a file work item according to another exemplary embodiment of the present invention.

FIG. 41 schematically shows the work flow a worker will perform when processing a file work item at step 4100. First, at step 4101, the worker will check the retry counter 'R' associated with this work item. Note that the retry counter was initialized to zero when the work item was first created. If it is less than some predetermined limit or threshold, the worker will lock the file as shown at step 4102. If the file is currently locked by another thread, the worker will be blocked until it acquires the lock. Next, the worker checks for file changes that are not yet committed to disk at step 4104. If the file has all changes committed to disk, the worker will clone it immediately at step 4103, unlock the file at step 4105, and go back to the idle worker pool at step 4111. Otherwise, the worker will issue a request for an asynchronous checkpoint if the file system currently has no outstanding checkpoint pending at step 4106, and increment the retry counter at step 4107. If the retry counter is less than some predetermined limit or threshold, the worker will unlock the file at step 4109. Otherwise, the file remains locked. Finally, the worker pushes the current file work item to the delay queue at step 4110 and the worker returns to the idle worker pool at step 4111. Note that the first task a worker performs when processing a file work item is to check the retry count as shown at step 4101. If it equals the retry limit, the worker concludes the file has no uncommitted changes because (i) the file has been locked since the last retry, and (ii) a checkpoint has occurred after it was locked. Therefore, the worker clones the file immediately as shown at step 4103, releases the lock at step 4105, and returns to the idle worker pool.

Figure 42:
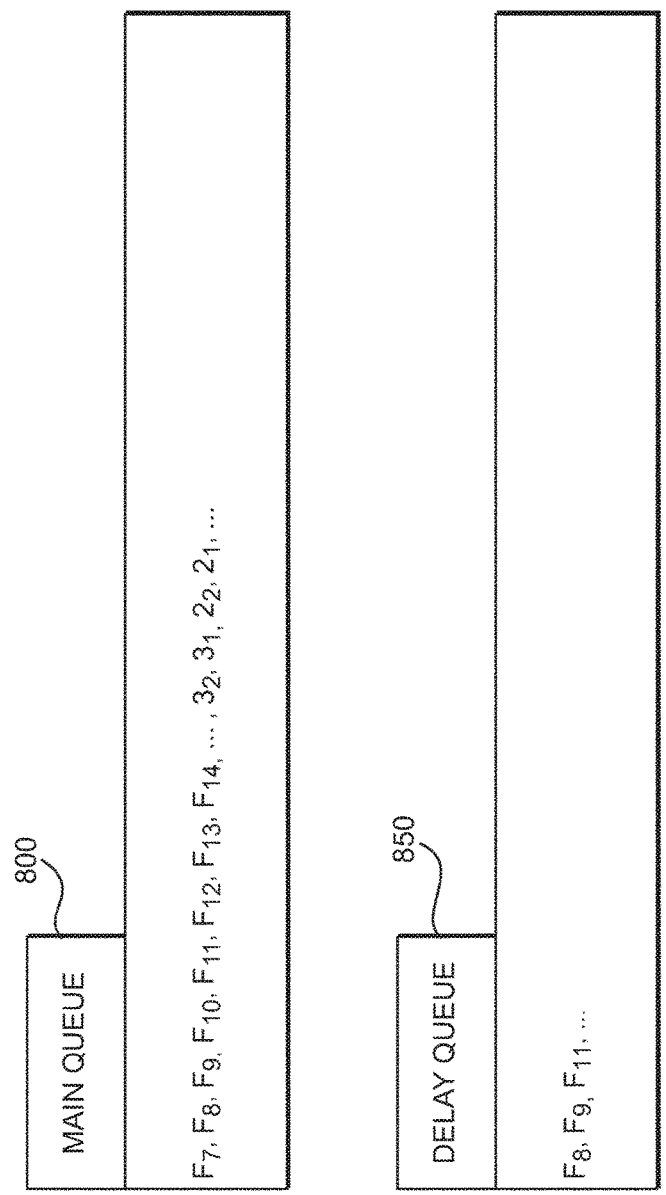
FIG. 42 schematically shows the processing flow of pushing all items from the delay queue to the main queue or secondary queue after committing a checkpoint to disk according to an exemplary embodiment of the present invention.

FIG. 42 schematically shows the work flow of the thread 4200 that handles file system checkpoints. It shows that when the time comes at step 4201 for a worker thread to commit a checkpoint for the file system, several tasks are performed before and after committing the checkpoint. Generally, the file system checkpointing thread 4200 will sleep/wake up at regular intervals and/or become active upon receiving a synchronous checkpoint request at step 4201. Pre-checkpoint processing is performed at step 4202. A checkpoint is committed at step 4203 resulting in all outstanding changes in the file system completely committed to disk. Post-checkpoint processing tasks are performed at step 4204, which include the task of processing the delay queue 850 shown separately at step 4205. The file work items in the delay queue will be pushed to the main queue if the relevant files are unlocked (step 4209), and to a separate secondary queue if locked (step 4210). As a result, each file in the delay queue is either pushed to the main queue or to the secondary queue. If all work items were pushed to the main queue from the delay queue, they could lead to a deadlock as described in the following example.

Suppose a file system is processing 50 directory tree cloning requests, where all of the trees share at least one source file 'f'. Thus, sooner or later, there will be lots of work items in the main queue and the delay queue, including the 50 work items $W_1, W_2, W_3, \ldots$ created specifically for a file 'x', each associated with a different tree cloning request. Suppose that the tree-cloning worker pool has only 20 workers. Suppose further that work item $W_1$ now appears in the delay queue with its file f locked because its internal retry count is equal to the threshold. All 20 tree-cloning workers will take turns popping work items off the main work queue to process. Soon a worker will pop $W_2$ off the main queue and process it (see FIG. 41). Because its retry count is less than the limit (step 4101), the worker tries to lock file f at step 4102 but becomes blocked immediately because f is already locked in work item $W_1$. The remaining idle workers continue to pop items off the main work queue to process. Soon, another worker will be blocked after it pops $W_3$ for the same reason as $W_2$. Eventually, all 20 workers will be blocked while attempting to acquire the lock on the same file f. At this point, all work items in the main work queue will temporarily stay there because there are no more idle tree-cloning workers to pop off. Suppose now the file system checkpointing thread commits a checkpoint at step 4203 in FIG. 42. If it pushes all work items from the delay queue to the main work queue, $W_1$ will then appear in the main work queue. The only chance for $W_1$ to move closer towards the head of the queue is when there is a free worker to pop off a work item from the main queue. But all 20 workers holding $W_2, W_3, \ldots$ are busy waiting for $W_1$ to release the lock. A deadlock now occurs because $W_1$ is also waiting for these workers to become free.

Such a deadlock can only be resolved by providing a different work queue to store all file-locked work items and dedicating a separate tree-cloning worker pool to service the queue. This queue is called the secondary work queue and the pool of workers the secondary worker pool. This is shown at steps 4208 to 4210 of FIG. 42. Note that the secondary queue need not be a priority-based queue because all of its work items are of the same priority.

Figure 43:
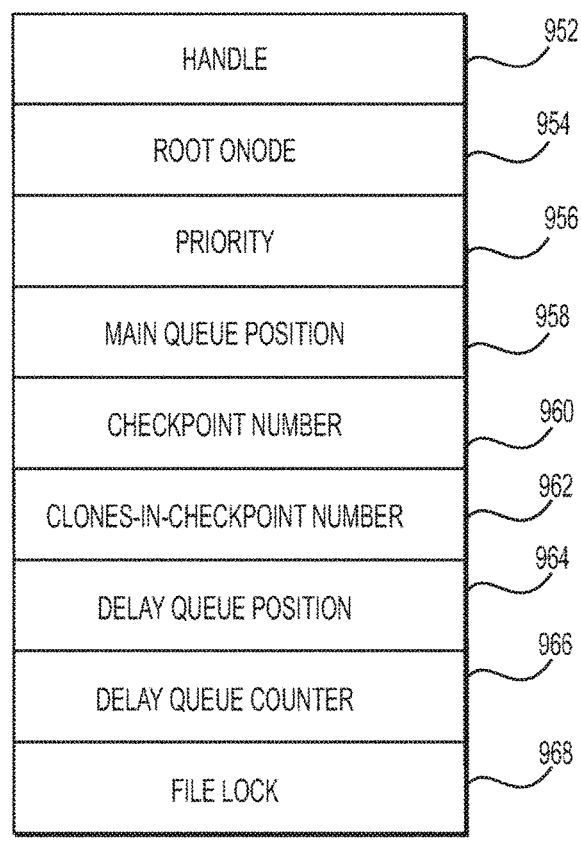
FIG. 43 schematically shows the processing flow of secondary tree-cloning workers popping work items off the secondary queue one after another and the associated processing according to an exemplary embodiment of the present invention.
Figure 44:
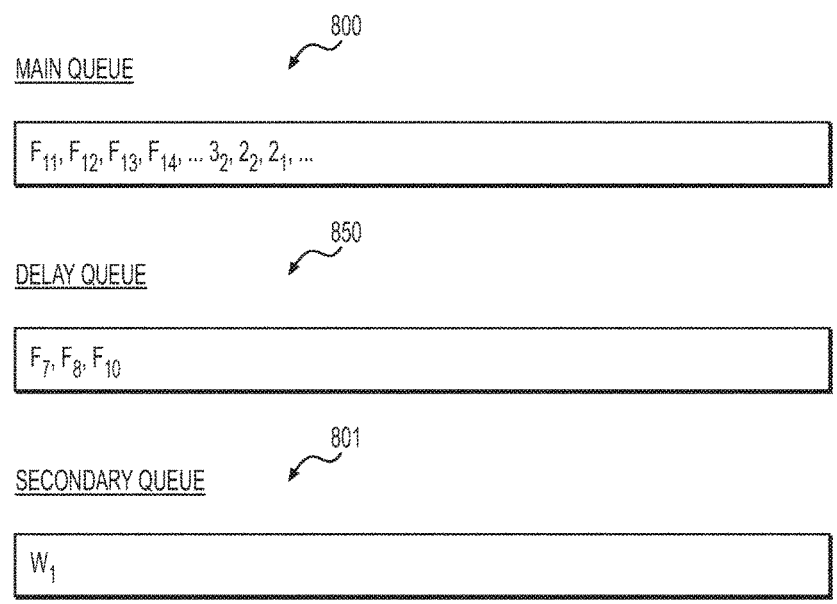
FIG. 44 schematically shows an exemplary main queue and delay queue according to an exemplary embodiment of the present invention.

FIG. 43 schematically shows a pool of 'K' idle tree cloning workers 4300 including the workers 4301, 4302, 4303 which wait for work items to be pushed to the secondary queue as shown in FIG. 42. Each of the workers 4301, 4302, 4303 always waits on the secondary queue and will pop a work item off the secondary queue as soon as the secondary queue is not empty at step 4305. The worker then clones the file immediately knowing that it is already locked and has no uncommitted changes at step 4306. Then it unlocks the file at step 4308 and returns to the secondary worker pool to repeat the process at step 4310. Note that the deadlock described in the example in FIG. 42 is resolved as follows. The locked-file work item W1 is pushed to the secondary work queue 801 as shown in FIG. 44, which will be cloned later by a tree cloning worker from the secondary worker pool. Once this is done, the lock on file f will be released, resulting in one of the 20 workers from the main tree worker pool immediately acquiring the lock on file f and proceeding further to the next step 4104 in FIG. 41. Eventually this worker will be done with its workload and will pop another work item from the main worker pool to process. As a result, the above described deadlock can be broken.

Note that the flow chart in FIG. 42 applies to both the main queue 800 and the secondary queue 801. The only difference is that work items from the secondary queue 801 always follow the path marked by steps 4101, 4103, and 4105.

FIG. 44 schematically shows the states of the main queue and the delay queue at a certain time after t22 for FIG. 31 where it is assumed subdirectory 32 has additional hidden files such as F7, F8 . . . . As expected, the main queue has all file work items positioned ahead of all directory work items and all subdirectories ahead of their respective parent directories. The delay queue contains only file work items and no directory work items. The main work queue shows F11 at the head of the queue whereas the delay queue shows F7, F8, and F10. These states can be explained by a number of scenarios. For example, all the files in F7, F8 . . . have been undergoing rapid modifications by other threads while the work items are in the main queue. As a result, when F7 was popped off the main queue, it was found unclonable and pushed back to the main queue for retry. Similarly for all other file work items F8, F9, . . . . They were all pushed back to the main queue and had to appear in the pushing order F7, F8, F9, F10, . . . . Thus, F7 is retried first and still is unclonable. The whole process repeats until F7 exhausted the maximum number of retries and was pushed to the delay queue instead. Similarly, F8 was pushed to the retry queue for the same reason. F9 was lucky to be cloned successfully before reaching the retry limit and hence does not show up in the delay queue. But F10 fell into the same fate as F8 and hence appears in the delay queue. F11 is in a retry state and is now at the head of the queue, waiting to be popped off as shown in FIG. 43.

FIG. 45 schematically shows the minimum structure of a work item for use in the embodiments of the present invention described above. The data 4500 to be stored are (1) the type of work item, which can be file or directory, (2) the handle to the file system object in a directory tree, (3) the priority of the work item, where files are assigned the highest priority and subdirectories priorities higher than their parents, (4) the object check point number, which marks the latest checkpoint for all changes to the object but does not tell whether this checkpoint is already committed to disk, (5) the file lock, which can reveal whether it is unlocked or locked by a tree-cloning worker, (6) the number of the last visited entry if the work item is for a directory, and (7) the retry counter if the work item is for a file.

All work items are stored in the main queue upon creation. The item at the head of the queue will be popped off by idle workers, one at a time. The item is then processed based on the information in the first field. If it is a directory work item, the processing follows FIG. 40 where the next entry in the directory contents to process is based on field (6). If it is a file work item, the processing follows FIG. 41 where the file is first locked if it is not locked by a tree-cloning worker based on the information contains in field (7). Next, the checkpoint number in field (4) is compared with the latest committed checkpoint of the file system. If it is less than or equal to the latest committed checkpoint, the file is concluded to have all changes committed to disk and hence can be cloned and unlocked. Otherwise, the retry count (7) will be incremented and used to decide whether to re-queue the file work item or push it to the delay queue. All file items accumulated in the delay queue will be later pushed to the main queue as soon as the file system commits another checkpoint to disk. Once in the main queue, they will be popped off the main queue and executed by idle workers, one after another.

The creation of a checkpoint otherwise referred to as a data-stream-snapshot object, the system preferably ensures that the source object is quiescent as previously described herein but the processing for cloning a file according to the processing as shown in FIG. 41, for example, differs in that steps Step A1 and Step A2 (reprinted below)

Step A1. Lock the source object against mutations.

Step A2. Perform a filesystem checkpoint, which effectively serializes the creation of clones on a given filesystem (although the creation rate will be limited by the rate at which the filesystem can commit the previous checkpoint to disk such that storage-side delays will result in longer create times).

are not necessary as unmodified files have not undergone mutations since the most recently completed checkpoint.

Thus, for cloning unmodified files the following steps are performed:

Step A3. Create a data-stream-snapshot object.

Step A4. Copy the block pointers from the source object's root onode to the data-stream-snapshot object's root onode.

Step A5. Record the current checkpoint number in the source object's root onode. This is the object's cloned-in-checkpoint number ("CCN"); it defines the earliest checkpoint in which the object's data stream can diverge from its associated data-stream-snapshot object's data stream.

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4a. Associate the new data-stream-snapshot object with the source file's current data-stream-snapshot object.

Step A4b. Record the source file's current cloned-in-checkpoint number in the new data-stream-snapshot object's root onode.

Further, files which are determined to have modifications that have not yet been committed to disk are moved to a delay queue 850 at step 4107. For example, modifications to a file are uncommitted to disk if the object checkpoint number is smaller than the latest committed checkpoint of the file system where the file resides. The delay queue 850 is a separate queue from the main work queue 800. It is not a priority-based queue; it is merely a collection of file work items already popped off from the main queue 800 which are determined to have modifications not yet committed to disk as shown in FIG. 41. The files on the delay queue 850 will have all of their modifications committed to disk once the file system commits its next checkpoint.

After the checkpoint is committed, the file system will push all file work items from the delay queue 850 to the main work queue 800. These file work items have no uncommitted changes and hence can be cloned safely as explained above.

Although specific details of illustrative methods are described with regard to the figures and other flow diagrams presented herein, certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

Conditional language, such as, among others, "can," "could," "might," or "may," unless specifically stated otherwise, or otherwise understood within the context as used, are generally intended to convey that certain embodiments include, while other embodiments do not include, certain features, elements and/or steps. Thus, such conditional language is not generally intended to imply that features, elements and/or acts are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
one or more processors;
one or more storage devices storing a first object;
a non-volatile memory; and
computer-readable storage media encoded with instructions that, when executed on the one or more processors, instruct the one or more processors to perform acts for copying the first object which stores a plurality of second objects which are at least partially stored on the one or more storage devices according to an organization of the second objects in a first queue managed by the one or more processors, the acts comprising:
cloning, according to positions of the second objects in the first queue, the second objects, which are unmodified since a last system checkpoint and stored on the one or more storage devices, and thereafter removing the second objects which have been cloned from the first queue;
moving the second objects, which have been modified since the last system checkpoint and stored in the non-volatile memory, from the first queue to a second queue managed by the one or more processors;
creating a new asynchronous system checkpoint when the second objects, which have been modified since the last system checkpoint, are moved to the second queue;
moving the second objects from the second queue to the first queue after creating the new asynchronous system checkpoint; and
cloning, according to positions of the second objects in the first queue, the second objects, which are unmodified since the new asynchronous system checkpoint and which are stored on the one or more storage devices by creating the new asynchronous checkpoint, and thereafter removing the second objects which have been cloned from the first queue.

2. The system according to claim 1, the acts further comprising:
traversing at least a portion of the first object to determine the second objects stored in the first object; and
organizing, in the first queue, at least a portion of the second objects stored in the first object, which is a file system directory, according to the traversal thereof,
wherein at least a portion of one or more of the second objects, which are file system objects, are stored outside of the one or more storage devices.

3. The system according to claim 2, the acts further comprising:
repeating one or more of the acts until all of the second objects stored in the first object have been cloned.

4. The system according to claim 1, wherein the second objects organized in the first queue are ordered on a priority-basis which reflects a hierarchy of the first object.

5. The system according to claim 1, wherein the second objects each include at least one data block and a set of pointers directly or indirectly referencing the at least one data block.

6. The system according to claim 4, wherein the cloning further includes for each second object to be cloned:
creating a read-only object and storing a copy of the set of pointers of the respective second object in the read-only object;
creating a clone object corresponding to the respective second object; and
storing a copy of the set of pointers in the clone object,
wherein the read-only object and the clone object share the at least one data block with the respective second object without making separate copies of the at least one data block for the read-only object and the clone object, and
wherein the respective second object and the clone object effectively become mutable versions of the read-only object.

7. The system according to claim 6, wherein the acts further include:
attributing to the clone object a size of the respective second object from which the clone object was created.

8. The system according to claim 1, wherein each of the second objects includes a root onode, and a set of pointers are stored in the root onode.

9. The system according to claim 8, wherein one or more of the second objects is a clone of another of the second objects, and the set of pointers of the clone refer to the root onode of the another of the second objects.

10. The system according to claim 8, wherein the acts of cloning second objects further includes for each second object to be cloned:
creating a read-only object and storing a copy of the set of pointers of the respective second object in a root onode of the read-only object;
creating a clone object corresponding to the respective second object; and
storing a copy of the set of pointers in a root onode of the clone object,
wherein the respective second object and the clone object effectively become mutable versions of the read-only object.

11. The system according to claim 1, wherein the acts further include:
locking access to the second objects for each of the second objects which has been moved to the second queue when a predetermined condition has been met; and
unlocking access to the locked second objects after cloning the locked second objects.

12. The system according to claim 10, wherein the predetermined condition is each of the second objects has been moved to the second queue a predetermined number of times without being cloned.

13. The system according to claim 1, wherein the new asynchronous system checkpoint is created after the cloning of all the second objects on the first queue which are wholly stored on the one or more storage devices.

14. The system according to claim 12, the new asynchronous system checkpoint is created when the second queue exceeds a predetermined size.

15. At least one non-transitory, computer-readable storage medium encoded with instructions that, when executed on one or more processors, instruct the one or more processors to perform acts for copying a first object that stores a plurality of second objects, the acts comprising:
cloning, according to positions of the second objects in a first queue managed by the one or more processors, the second objects which are unmodified since a last system checkpoint and wholly stored on the one or more storage devices, and thereafter removing the second objects which have been cloned from the first queue;

moving the second objects, which have been modified since the last system checkpoint and are stored in a non-volatile memory, from the first queue to a second queue managed by the one or more processors;

creating a new asynchronous system checkpoint when the second objects, which have been modified since the last system checkpoint, are moved to the second queue;

moving the second objects from the second queue to the first queue after creating the new asynchronous system checkpoint; and cloning, according to positions of the second objects in the first queue, the second objects, which are unmodified since the new asynchronous system checkpoint and wholly stored on the one or more storage devices by creating the new checkpoint, and thereafter removing the second objects which have been cloned from the first queue.

* * * * *